United States Patent
Maurer et al.

(10) Patent No.: US 11,458,573 B2
(45) Date of Patent: Oct. 4, 2022

(54) LAYER SELECTIVE EXPOSURE IN THE OVERHANG REGION IN GENERATIVE MANUFACTURING

(71) Applicant: TRUMPF Laser- und Systemtechnik GmbH, Ditzingen (DE)

(72) Inventors: Dominik Maurer, Korntal-Muenchingen (DE); Roland Spiegelhalder, Leonberg (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 0 days.

(21) Appl. No.: 15/930,138

(22) Filed: May 12, 2020

(65) Prior Publication Data

US 2020/0269352 A1 Aug. 27, 2020

Related U.S. Application Data

(63) Continuation of application No. PCT/EP2018/073788, filed on Sep. 4, 2018.

(30) Foreign Application Priority Data

Nov. 13, 2017 (DE) .......................... 102017126624.0

(51) Int. Cl.
*B23K 26/342* (2014.01)
*B33Y 10/00* (2015.01)
(Continued)

(52) U.S. Cl.
CPC .......... *B23K 26/342* (2015.10); *B23K 26/073* (2013.01); *B23K 26/082* (2015.10);
(Continued)

(58) Field of Classification Search
CPC .... B22F 3/1055; B22F 2998/10; B22F 3/008; B22F 2005/005; B22F 2207/01;
(Continued)

(56) References Cited

U.S. PATENT DOCUMENTS

2011/0221099 A1* 9/2011 Oberhofer ............. B29C 64/153
264/401
2014/0053956 A1* 2/2014 Etter ................... C22C 32/0026
148/555
(Continued)

FOREIGN PATENT DOCUMENTS

CN 105834421 A 8/2016
CN 106041079 A 10/2016
(Continued)

OTHER PUBLICATIONS

DE Search Report in German Appln. No. 102017126624, dated Jun. 29, 2018, 12 pages (with English translation).
(Continued)

*Primary Examiner* — Justin C Dodson
(74) *Attorney, Agent, or Firm* — Fish & Richardson P.C.

(57) ABSTRACT

Methods and systems for generative manufacturing of a three-dimensional component from a powder, wherein a layer structure model of the component to be manufactured is divided into a core region and a shell region adjacent to the core region, and wherein the shell region forms at least a portion of the surface of the three-dimensional component. Then, a layer-based irradiation process is performed in which a density of irradiated powder layers is lower in the shell region than in the core region.

19 Claims, 11 Drawing Sheets

(51) Int. Cl.
  *B33Y 30/00*  (2015.01)
  *B33Y 50/02*  (2015.01)
  *B23K 26/073*  (2006.01)
  *B23K 26/082*  (2014.01)
(52) U.S. Cl.
  CPC ............... *B33Y 10/00* (2014.12); *B33Y 30/00* (2014.12); *B33Y 50/02* (2014.12)
(58) Field of Classification Search
  CPC .. B22F 3/1103; B22F 3/10; B22F 3/16; B22F 3/1115; B22F 7/064; B22F 2007/042; B22F 7/00; B29C 64/393; B33Y 10/00; B33Y 30/00; B33Y 50/02
  See application file for complete search history.

(56) References Cited

U.S. PATENT DOCUMENTS

| | | | |
|---|---|---|---|
| 2016/0059493 A1* | 3/2016 | Sparks ............... | G05B 19/4099 700/98 |
| 2016/0221115 A1 | 8/2016 | Loeffel et al. | |
| 2016/0233060 A1 | 8/2016 | Narendmath et al. | |
| 2018/0050423 A1 | 2/2018 | Hoferer | |
| 2018/0071986 A1* | 3/2018 | Buller ..................... | C22C 33/02 |
| 2018/0111319 A1* | 4/2018 | Brezoczky ............. | B33Y 40/00 |
| 2018/0243828 A1 | 8/2018 | Hoferer | |
| 2018/0250744 A1* | 9/2018 | Symeonidis ....... | B23K 26/0876 |

FOREIGN PATENT DOCUMENTS

| | | |
|---|---|---|
| CN | 106424723 A | 2/2017 |
| CN | 107210179 A | 9/2017 |
| DE | 102011105045 B3 | 6/2012 |
| DE | 102015204630 A1 | 9/2016 |
| DE | 102015217469 A1 | 3/2017 |
| EP | 1720676 A1 | 11/2006 |
| EP | 2732890 A2 | 5/2014 |
| EP | 3053674 A1 | 8/2016 |
| EP | 3127635 A1 | 2/2017 |

OTHER PUBLICATIONS

Foster et al., "Optical, layerwise monitoring of powder bed fusion," Proceedings: 26th Annual International Solid Freeform Fabrication Symposium, Aug. 2015, 295-307.
PCT International Preliminary Report on Patentability in International Appln. No. PCT/EP2018/073788, dated Jun. 19, 2020, 18 pages (with English translation).
PCT International Search Report and Written Opinion in International Appln. No. PCT/EP2018/073788, dated Jan. 3, 2019, 18 pages (with English translation).
CN Office Action in Chinese Appln. No. 201880073569.7, dated Jan. 30, 2022, 9 pages (with English translation).

\* cited by examiner

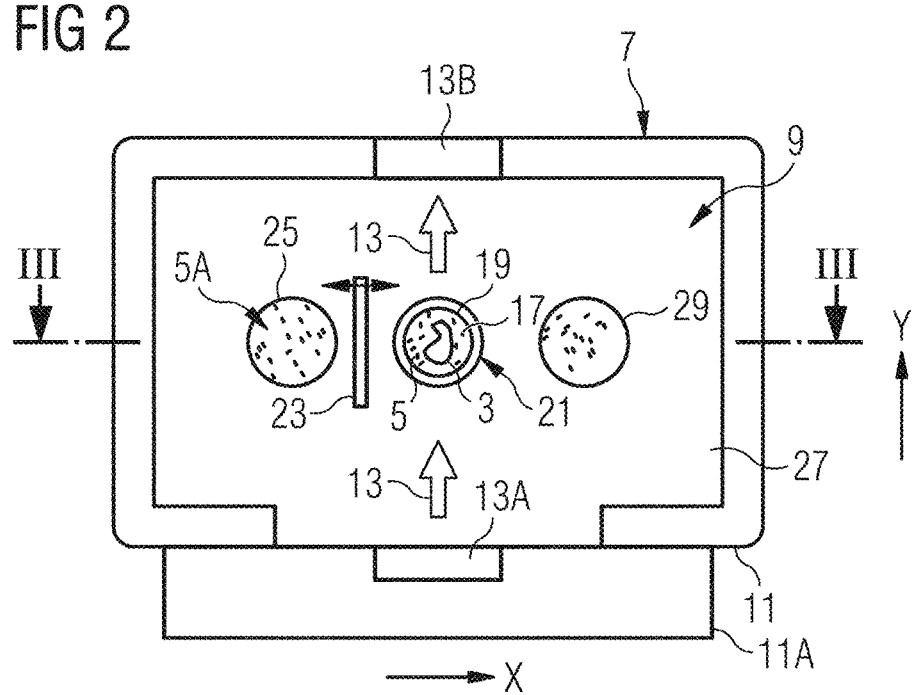
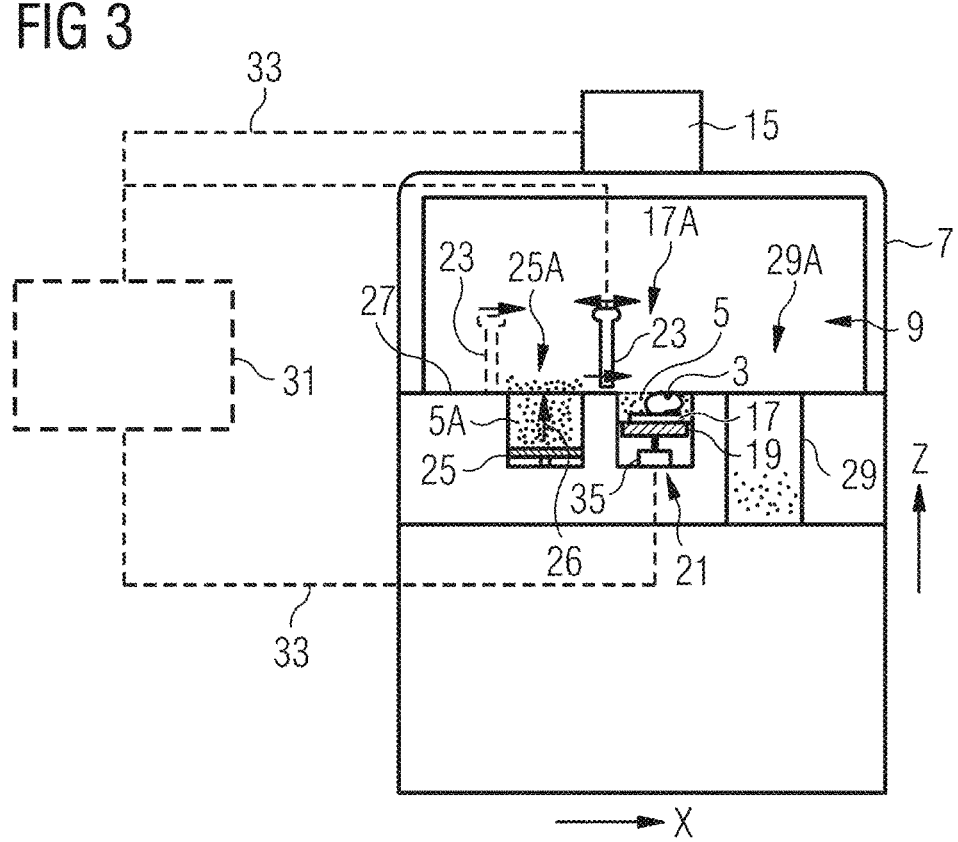

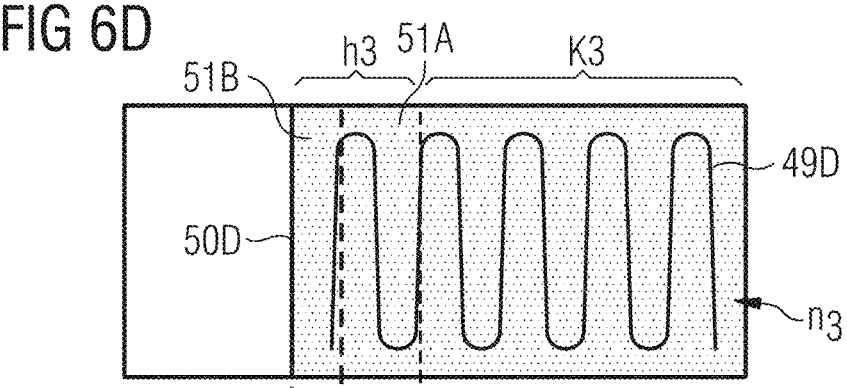
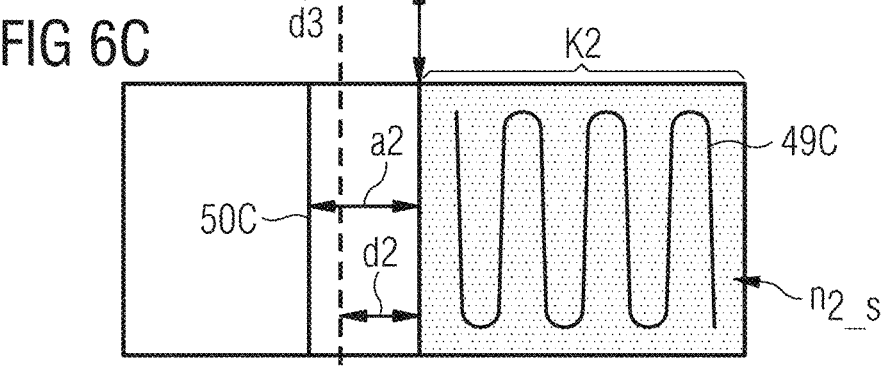
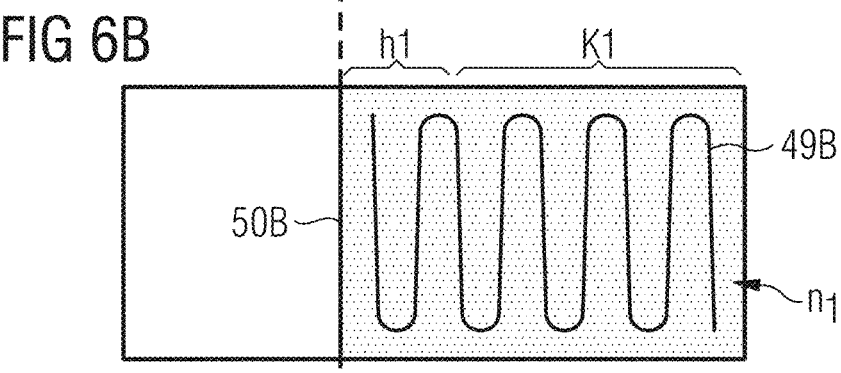
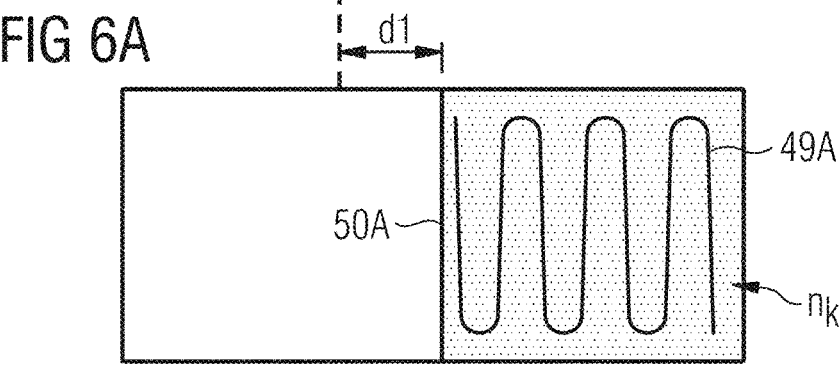

LAYER SELECTIVE EXPOSURE IN THE OVERHANG REGION IN GENERATIVE MANUFACTURING

CROSS REFERENCE TO RELATED APPLICATIONS

This application is a continuation of and claims priority under 35 U.S.C. § 120 from PCT Application No. PCT/EP2018/073788, filed on Sep. 4, 2018, which claims priority from German Application No. 10 2017 126 624.0, filed on Nov. 13, 2017. The entire contents of each of these priority applications are incorporated herein by reference.

TECHNICAL FIELD

The present disclosure relates to a process of generative manufacturing, e.g., laser-based, of three-dimensionally produced components, which in particular have an overhang region. Furthermore, the disclosure relates to a device for generative manufacturing.

BACKGROUND

The laser-based generative manufacturing of components, especially metallic or ceramic components, is based on the solidification of a starting material on a building platform, e.g., in powder form, by irradiation with laser light. This concept—also known as selective laser melting (SLM) or powder bed fusion—is used in machines for (metallic) 3D printing, among other things. In the case of 3D printing based on a metallic powder, one also refers to Laser-Metal-Fusion (LMF) systems. An example of a machine for generative manufacturing of three-dimensional products is disclosed in the European patent application EP 2 732 890 A2 of Sisma S.p.A. The advantages of generative manufacturing are generally a simple production of complex and individually producible parts.

The aspects disclosed herein refer to the effect of the generative manufacturing process on near-surface regions of a component. These regions, also known as the shell (or "skin"), include regions on the top, bottom, and sides of a part. The near-surface regions are referred to herein as upskin regions (shell regions on the side of the laser beam that is incident), downskin regions (shell regions on the side away from the laser beam), and sideskin (or inskin) regions (shell regions that extend essentially along the direction of the laser beam).

For example, Chapter I "Additive Manufacturing of Al Alloys and Aluminium Matrix Composites (AMCs)" of the book "Light Metal Alloys Applications" (ISBN 978-953-51-1588-5; 11 Jun. 2014) describes such a classification into such areas and the assignment of different parameters to the areas.

A downskin region of the component generally extends where the resulting section of the component is generated on powder in the laser beam direction. In subsequent coating processes, an upskin region of the component is covered with powder that is not irradiated. An upskin region usually forms a surface of the component on the side of the laser beam incidence. A downskin region, for example, extends along the underside of the workpiece, here in the sense of the first irradiated layers, or along the underside of an overhang region of the component. A sideskin region represents a lateral border of the component, which is given by the lateral extent of the irradiation in the layer plane. Accordingly, it borders laterally on unirradiated powder. The sideskin regions enclose the inner region of the component or a section of it. This is often referred to as the core of the component.

The effects of the generative manufacturing process on these near-surface regions concern, for example, the stability, shape accuracy, and surface quality of the component. These effects, therefore, also determine whether a component with a planned geometry can still be manufactured in such a way that it meets the respective product requirements. When LMF components made of steels are built up by powder bed-based laser melting, for example, overhanging surfaces with (overhanging) angles below a so-called critical angle (e.g., below approximately 60° with respect to the vertical) with respect to a layer plane can often be produced only with quality reductions. EP 1 720 676 B 1, for example, discloses that the exposure of a powder layer in an overhang region can lead to a melt that acts beyond the individual layer and makes it more difficult to produce a true-to-form product.

An example of an approach to ensure high shape fidelity when irradiating layers in the overhang region is described in the applicant's EP 3 127 635 A1. This disclosure involves reducing the exposure energy in each layer of the overhang region near the component contour, especially in the downskin region. The reduction of the exposure energy when irradiating a layer can be carried out in steps and dependent on the angle of overhang.

The determination of the parameters of a generative manufacturing process for a specific powder is carried out in special test procedures in which the type of material, particle size distribution, and particle shape of the powder, for example, can be relevant. For example, the energy density to be introduced is determined. The general goal in determining the parameters of a generative manufacturing process is to use a high-energy laser beam with a high scanning speed in order to achieve a sufficiently high speed in the manufacturing process.

Usually, these test procedures use the production of appropriately designed test objects for the respective manufacturing scenarios of additive manufacturing. Test objects have structures that are designed for parameter determination. For example, test objects have an overhang with a linear surface that extends at an inclination of a critical angle to be reached and/or a section with a curved surface and/or a section that has an overhang with a linear surface that extends flatter than the critical angle.

In addition to the energy densities for core regions, the parameters for inskin and downskin regions can also be defined. If a number of overhang angles are tested at desired laser parameters, the critical angle mentioned above can be determined, beginning at which, e.g., support structures become necessary.

The test procedures are usually based on a test manufacturing process in which a number of identical test objects are created on a base plate. For each of the test objects, separate parameters of the manufacturing process are implemented. The test objects are then evaluated with regard to their quality. For this purpose, they are examined in particular with regard to strength, density, deformation, coloration, etc. In this way, for example, a first parameter range can be determined with a test production process and a correspondingly large number of test objects and parameter sets, the parameter range being then refined in subsequent test production processes. The parameters to be varied can, for example, represent the energy, focus diameter and shape, and/or scanning speed of a laser beam, but also the applied layer thickness of the powder.

To determine the appropriate energy density in a core region and a downskin region of the test object, a stepwise energy density reduction can be performed for a specific test object structure, for example, starting from a 100% value of a given energy density, while maintaining the same layer thickness.

The operator of machines for generative manufacturing, but also the powder supplier or the machine manufacturer, can determine these parameters for the operator.

In some technology segments, for example, the market may require a convertible inclination at a critical angle of 45° or steeper for manufacturing without supporting structures. The relevance of the critical angle with regard to support structures to be provided during production is discussed, for example, in "Design Optimisation for Selective Laser Melting (SLM) and Experimental Testing of an Aircraft Component", L. M. R. Seabra, Thesis to obtain the Master of Science Degree in Aerospace Engineering, Tecnico Lisboa, May 2015.

SUMMARY

One aspect of this disclosure is based on the object of proposing a generative manufacturing process that allows the creation of overhang regions. Another object is to enable generative manufacturing that can be planned as independently as possible of the direction of movement of a coater. A further task is to propose a generative manufacturing process that enables the building of overhang regions even with powder layer thicknesses in the range of the powder grain size.

In one aspect, the disclosure provides methods for generative manufacturing of a three-dimensional component from a powder that include the following steps:

dividing a layer structure model of the component to be manufactured into a core region and a shell region adjacent to the core region, the shell region forming at least a portion of the surface of the three-dimensional component, and performing a layer-based irradiation process based on the layer structure model, in which a density of irradiated powder layers in the shell region is lower than in the core region that is adjacent in the layer plane direction, wherein the density is given by the number of irradiated layers in the direction of the normal of the powder layers per unit length.

In a further aspect, the disclosure provides methods for generatively manufacturing a three-dimensional component from a powder, the component having an overhang structure and being manufactured by selective laser melting on a building platform, that include the following steps:

providing an irradiation plan based on a layer model of the three-dimensional component, wherein the layer model includes a sequence of layers, each of which is associated with a layer-specific contour of the component, wherein the sequence includes a first subgroup of layers and a second subgroup of layers, which are interleaved in one another, and wherein in the first subgroup of layers, irradiation of the powder up to the contour is planned in the region of the overhang structure, and in the second subgroup of layers irradiation of the powder is planned only up to a distance from the contour in the region of the overhang structure, and performing a sequential application of powder layers on the building platform and irradiating the powder layers with irradiation parameters of the laser beam according to the irradiation plan.

In a further aspect, the disclosure provides manufacturing devices for generative manufacturing of a three-dimensional component from a powder that include a manufacturing space providing a work surface and including a platform area, and a building cylinder having a vertically movable support on which the three-dimensional component is to be manufactured layer by layer on a surface of a building platform.

Furthermore, the manufacturing devices include a pusher device with a coater for producing powder layers with the powder in the platform area, an irradiation system for generating a beam for irradiating the powder layers in the platform area to produce the three-dimensional component layer by layer, and a control unit that, based on irradiation data of an irradiation plan of the three-dimensional component, controls the manufacturing of the three-dimensional component according to a method described herein. The irradiation data may define areas of the powder layers to be irradiated, the areas to be irradiated may include a shell region and a core region, and a density of irradiated powder layers in the shell region may be lower than in the core region.

In a further aspect, the disclosure provides components that have been generatively manufactured from a powder by selective laser melting and that have a core region and a shell region, the shell region forming at least part of a surface of the component. The selective laser melting has been performed with a reduced energy input at least in a part of the shell region by irradiating fewer layers in a layering direction than in the core region, and in the shell region or in a portion of the shell region each irradiated powder layer coincides with an irradiated powder layer in the core region.

It can be seen that the concepts disclosed herein make a comparison of densities of irradiated layers based on several adjacent layers of the layer model. In other words, a shell region or a part of the shell region is compared with the adjacent core region (or an adjacent part of the core region) in the layer plane direction with respect to the density of irradiated layers.

In some embodiments, the layer-based irradiation process can include a sequential application of powder layers, the powder layers can be irradiated with a core energy input and the layers in the shell region can be subjected to layer-selective irradiation. In the case of a layer-selective irradiation of the shell region, the density of irradiated powder layers can be varied as a function of the surface geometry of the three-dimensional component. For example, the density of irradiated powder layers in the region of an overhang structure can be further reduced the larger the distance between contours (adjacent layers) is, and in particular the flatter the overhang structure runs to the layer plane given by the surface of the powder bed.

In some embodiments, only every $n^{th}$ layer of the applied powder layers can be irradiated in the shell region or in a section of the shell region, or every $n^{th}$ layer of the applied powder layers cannot be irradiated in the shell region or in a section of the shell region.

In some embodiments, irradiation within a powder layer, in particular in the entire component, in the core region and in the shell region, can be carried out with the same laser power. The energy input in the shell region can be reduced compared to the core region despite the same laser power due to layer-selective irradiation.

In some further developments, an irradiated powder layer in the shell region or in a section of the shell region may coincide with an irradiated powder layer in the core region and wherein this powder layer in the shell region and in the core region is irradiated in a common irradiation process (i.e., as one layer).

In some embodiments, inskin parameters can be used when performing the layer-based irradiation process in a shell region to which no adjacent core region is assigned in the layer plane direction, e.g., on the underside of the component to be manufactured, the inskin parameters being provided for a density of irradiated powder layers in a core region that is higher than the density of the powder layers in this shell region. Again, it can be seen that the concepts disclosed herein involve a comparison of densities of irradiated layers based on several adjacent layers of the layer model.

In some embodiments, an applied powder layer can have a thickness in the range of a medium grain size of the powder. For example, this can be in the range of 30% to 300% of the average grain size of the powder.

In some embodiments, the extent of the shell region can be determined by a distance of the contour from the irradiated area of a layer whose irradiation does not reach the contour of the three-dimensional component. Alternatively or additionally, the number of successive layers which are not irradiated up to the respective contour of the three-dimensional component can determine the extent of the shell region.

In some embodiments, powder can be applied with a coater from a supply region in an application direction to apply the powder layers, and the overhang structure can be aligned against the application direction in such a way that the contour of at least one layer to be subsequently irradiated in the area of the overhang structure projects closer to the supply region than the contour of a previously irradiated layer. Furthermore, the irradiation parameters of the laser beam can be fixed or set according to the desired interaction of the laser beam with the powder in a core region of the component.

In some embodiments, a layer can be subdivided in the layer structure model into, e.g., rectangular, irradiation fields, wherein in the irradiation process an energy input is made into irradiation fields in the shell region, e.g., in the area of the layer close to the contour (near contour region), which is reduced compared to the energy input in the core region, e.g., in irradiation fields far from the contour (far-contour irradiation fields). The irradiation fields of a layer, which are cut by the contour of the layer, can only be irradiated in the inner region forming the component.

In further developments, the start of irradiation can begin with a reduced energy input in the region of those irradiation fields which are cut by a contour of a layer projected onto the layer, in particular in the layer direction, this layer having been irradiated in the shell region up to the contour.

In general, the irradiation fields of an irradiation plan that are cut by a contour projected onto the layer, e.g., in the direction of the layer, can be irradiated as a whole with the reduced energy input or as a whole with the energy input of the core region.

Here, the density of irradiated powder layers is given by the number of irradiated layers in the direction of the normal of the layer plane (layering direction) and per unit length. The layer plane is given by the plane powder bed surface, which is created by the powder application with the coater. If—as is usually the case in the core region—each layer is irradiated, the density is maximum. For thin layers, for example, 25 layers are irradiated to produce a material thickness (in normal direction) of 1 mm. If layers are omitted in the shell region during irradiation, the density is reduced there. It is halved, for example, if alternately one layer is irradiated and one is not, or it is divided into three if only every third layer is irradiated. If the laser radiation parameters are the same, the energy input is reduced accordingly. A reduced density of irradiated powder layers results in a reduced volume energy (in [J/m^3]) (introduced into the powder by the irradiation), which is essentially given by volume energy=laser power/(layer thickness*scanning speed*track distance)

In this context, the core energy input is also the energy that must be introduced into the powder on average with the irradiation in order to obtain the desired, powder-specific interaction (usually the degree of melting due to the volume energy supplied) that is intended for the core region of the component.

In this context, it should be mentioned that a reduced volume energy is required for greater layer thicknesses, because for a higher layer thickness, underlying layers are melted less. Thereby, less heat is dissipated into the underlying layers and as a result for a higher layer thickness, a lower volume energy is required to achieve a high component density.

The new methods and systems provide certain advantages including a very good buildability of 45° overhang angles against the direction of the coater's movement during powder application, and a buildability of strong overhangs against the direction of the coater's movement, e.g., overhang angles of up to 30° or less. In many cases, this allows a reduction of support structures, if not a support-free construction of such geometries. Furthermore, it can also allow the construction of overhangs lying inside the component, which often cannot be supported or whose supporting structures cannot be removed after production. Overhangs lying inside the component can thus be manufactured more accurately in terms of shape using the concepts disclosed herein.

Further advantages concern the energy input and the laser radiation. For example, the production of the downskin region can be integrated into a process step assigned to the core, while the temporal energy input into the overhang can still be kept smaller than when exposing the core. A reduction of the energy input into the shell region, in particular into the downskin region, is achieved, resulting in a better surface quality and buildability. The continuous exposure of shell and core regions can be implemented with a simple exposure strategy, accompanied by a uniform energy input, which can be implemented by large motion vectors extending into the overhang.

In other words, there is no longer any need to define a separate exposure strategy (with regard to the laser parameters in particular) for the downskin region, because the herein proposed selective exposure of the downskin region, for example, continues the exposure of the core selectively into the shell region. Thus, in addition to the inskin parameters for the laser system, i.e., parameters for the laser system (inter alia laser power, focus size, scan speed and powder layer thickness) that define the energy input into the core (inskin region with lateral surfaces of the component, i.e., there is no upskin or downskin adjustment), and no additional downskin parameters need to be developed for the laser system.

In general, parameter development for the manufacturing of overhangs can be greatly simplified. This also simplifies parameter development, especially for different materials, by reducing the relevant parameters to be considered in the planning. In particular, the energy is now a quasi-fixed parameter. In other words, a uniform, albeit layer-wise selective, exposure can be performed using the inskin parameters of the laser beam.

The concepts proposed herein can also allow the elimination of support structures, which often need to be provided when building overhanging areas facing in the direction opposite to the direction of coater movement to avoid distortion of the component. That means, the building and often manual removal of support structures after the building process can be eliminated, reducing component costs through less data preparation and rework. In general, the surface quality of otherwise supported surfaces can be improved.

In some embodiments of the concepts disclosed herein, selective exposure of layers can also be applied only in downskin regions that are below a critical angle. Without implementation of selective exposure such downskin regions might only be buildable by supporting structures.

The procedures disclosed herein can surprisingly eliminate disadvantageous aspects from the state of the art, such as discoloration of overhangs, warpage and deformation of the component, and even process determinations, in the case of excessive deformation, which can lead to a collision of a raised overhang edge with the coater blade.

For example, a possible slight distortion of the overhang edge can be compensated by an effectively greater layer thickness in the downskin region, especially in the case of overhangs that extend in the direction opposite to the coater movement. This reduces or even avoids a powder jam in front of the component, which could otherwise increase the distortion of the overhang edge.

A possible explanation for some of the positive effects of the concepts disclosed herein may be related to the particle size distribution of the (metal) powder used. Due to the particle size distribution, powder with an average particle size of, e.g., 30 μm, can have a larger number of grains with sizes of, e.g., 15 μm to 45 μm. Especially when building overhanging areas, it is common to apply thin layers of powder so that the component does not appear "stepped." Correspondingly, the coater is raised a little above the manufacturing plane. As a result, when applying 40 μm thin layers, for example, the larger grains no longer fit between the coater and the component and are thus carried along by the coater. The larger grains can get caught on the side of the component facing the coater. They can then either be pressed down into the last irradiated layer or, pushed by the coater, they can take the thin, already exposed overhang layers upwards. This can disturb the dimensional accuracy. In addition, the next powder application can have even greater effects, up to a process termination.

However, if, as suggested herein, the density of irradiated layers in the shell region is reduced, e.g., only every $n^{th}$ layer is irradiated, this corresponds at least partially to a thicker coating with powder with correspondingly less effect on the manufacturing process. For example, the exposure of only every second layer in the shell region can already lead to a powder layer that is essentially twice as thick, in the previous example 80 μm thick, on the thin and unstable front edge of the component in the direction from which the coater approaches. In the coating process carried out in the core region in between, larger grains can now only remain stuck further inside the component and thus have no effect on the area of the component close to the surface, especially the quality of the surface there.

For completeness, reference is made to the procedures of a special "shell-core strategy" described, for example, in DE 10 2011 105045 B3, whereby the concepts disclosed herein differ therefrom or can be used in addition to the procedure described below in particular for transitions between different irradiation strategies.

For a brief explanation of the well-known concept of the "shell-core strategy," the component is divided into a shell region and a core region, whereby these two areas can be parameterized (completely) independently. The exposure strategies in the regions can also be provided independently and can change accordingly at a boundary between the regions inside the component. For example, a comparatively thin powder layer thickness and low laser power can be provided in the shell region and a comparatively thick powder layer thickness and high laser power in the core region, whereby the layer thickness of the core region is usually a multiple of the layer thickness of the shell region. With regard to the exposure strategy, a checkerboard or strip exposure can be provided in the core region, whereas an offset filling strategy or a plurality of contours can be implemented in the border region. In this way, a high build-up rate or productivity can be achieved in the core region. In the shell region, on the other hand, with its own process parameters, an outwardly good surface quality can be produced, which in particular can only be achieved with a lower layer thickness.

In contrast to this shell-core strategy, the procedure for layer-selective exposure described herein does not require a real differentiation into a "shell region" and a "core region." With the proposed selective exposure, on the one hand, the exposure (especially the intended laser parameters) of the component interior can be applied continuously up to the outer contour and, on the other hand, the area of exposure can be slightly reduced layer by layer in the downskin regions in order not to introduce energy in the respective layer outside the reduced core region. Thus, there is no need for a separately parameterizable "shell region," in contrast to the conventional "shell-core strategy" described above. Instead, a reduction of the area of exposure performed in a specific rhythm, a kind of shell region can be created that, however, only differs in the layer thickness from the "core region" within the component and, moreover, can always be exposed continuously with the core region. Thus, inter alia, the same process parameters such as laser power, traversing speed, and hatch distance can be used with a continuous exposure strategy such as a row-by-row exposure of a chessboard structure.

One of the advantages of the selective downskin exposure described herein is that the exposure process can be continuous and does not need to be parameterized separately for the inskin and the downskin regions.

Other embodiments of the new methods and systems described herein refer to the transitions between different irradiation strategies. This applies, e.g., to components that are built with different irradiation strategies in different zones in the shell region to optimally map the respective component geometry. The zones include in particular the zones for downskin, upskin, and inskin regions; i.e., in generative manufacturing, the irradiation strategies in the shell region are subdivided into zones for downwardly inclined, upwardly inclined, and/or lateral surfaces of the component. Thereby, several zones can also be used in the individual downskin, upskin, or inskin regions to further differentiate the irradiation strategies.

The inventors have now also recognized that visible transition lines can be created on the surface if the transition of the zones and thus of the irradiation strategies occurs abruptly at defined angles in the course of the surface of the component. These transition lines can, in particular, influence the optical appearance of the component, require corresponding reworking, and/or negatively affect mechanical properties of the component.

To improve especially the appearance and, if necessary, the shape and mechanical properties of the components, the inventors propose further that a zone transition should not be rigidly defined by means of a limit angle, but should be allowed to occur successively. Various options are proposed for the technical implementation of a successive zone transition. For example, a zone transition is possible in an angular range to be defined in more detail.

As will also be explained below using FIGS. 13 to 16, a component can have a transition between zones in a layer if this layer extends over shell regions to which different courses of the surface in downskin, upskin, and inskin regions are assigned. These are referred to herein as zone transitions in the X/Y direction, i.e., in the layer plane. In addition, adjacent layers can be assigned to different zones, e.g., if they have different surface gradients, which in turn are assigned different irradiation strategies. This is referred to herein as zone transition in the Z-direction, i.e., across layers.

In summary, manufacturing processes, in particular further embodiments of the processes described above, may have the following features:

In some embodiments, the surface of the three-dimensional component has at least two adjacent zones to which at least two irradiation strategies are assigned. At least one of the irradiation strategies has the irradiation process based on the layer structure model in which a density of irradiated powder layers in the shell region is lower than in the core region adjacent in the layer plane direction. In a transition region of the zones forming the surface of the three-dimensional component, a change between the irradiation strategies within a layer can be carried out in such a way that a spatial position of the change varies bidirectionally in a sequence of adjacent layers. In addition or alternatively, a multiple back and forth changes between the irradiation strategies in a sequence of adjacent layers along the layer build-up direction can be carried out.

In some embodiments, the at least two adjacent zones include at least one irradiation zone for the shell region and one irradiation zone for a section produced by an irradiation process according to the core region. In addition or alternatively, the at least two adjacent zones can be formed in the shell region and/or the at least two adjacent zones include upskin, downskin, and/or inskin zones.

In some embodiments, the spatial position of the change and/or the back and forth change can be effected by assigning transition parameters, e.g., zone transition angles, in an angular range around a predetermined transition angle, the assignment being effected, for example, by a random algorithm or according to a predetermined pattern.

In some embodiments, the spatial position of the change and/or the back and forth change can be effected by assigning a predetermined transition angle, and increasing or decreasing the size of zones resulting from the transition angle. The zones resulting from the transition angle can be increased or decreased, e.g., by a random algorithm or according to a predetermined pattern in the transition region.

Other aspects of the present disclosure include computer programs (or computer program products) and computer-readable media on which a corresponding computer program is stored. The computer programs/computer program products include instructions which, when the program is executed by a computer, e.g., by a computer-implemented control unit for operating a manufacturing device for generative manufacturing of a three-dimensional component, cause the computer/control unit to execute/initiate methods described herein for generative manufacturing of a three-dimensional component from a powder.

The computer programs/computer program products and the computer readable medium are provided to perform one of the methods disclosed herein. The computer programs can be stored on a non-volatile memory, which in particular is used as a part of a control unit for operating a manufacturing device for generative manufacturing of a three-dimensional component.

The computer-readable medium and the computer programs/computer program products can further include computer-executable instructions configured to trigger/control a manufacturing device for generatively manufacturing a three-dimensional component as described herein.

DESCRIPTION OF DRAWINGS

Herein, concepts are disclosed that allow at least partly to improve aspects of the prior art. In particular, additional features and their usefulness result from the following description of embodiments on the basis of the drawings.

FIG. 2 is a schematic sectional view of the generative manufacturing device of FIG. 1 parallel to the XY plane through the manufacturing space.

FIG. 3 is a schematic sectional view of the generative manufacturing device from FIG. 1 parallel to the XZ plane through the manufacturing space as indicated in FIG. 2.

FIGS. 6A to 6D are schematics that illustrate layer-selective irradiation in a top view of layers in the transition region between the shell and the core.

DETAILED DESCRIPTION

Figure 1:
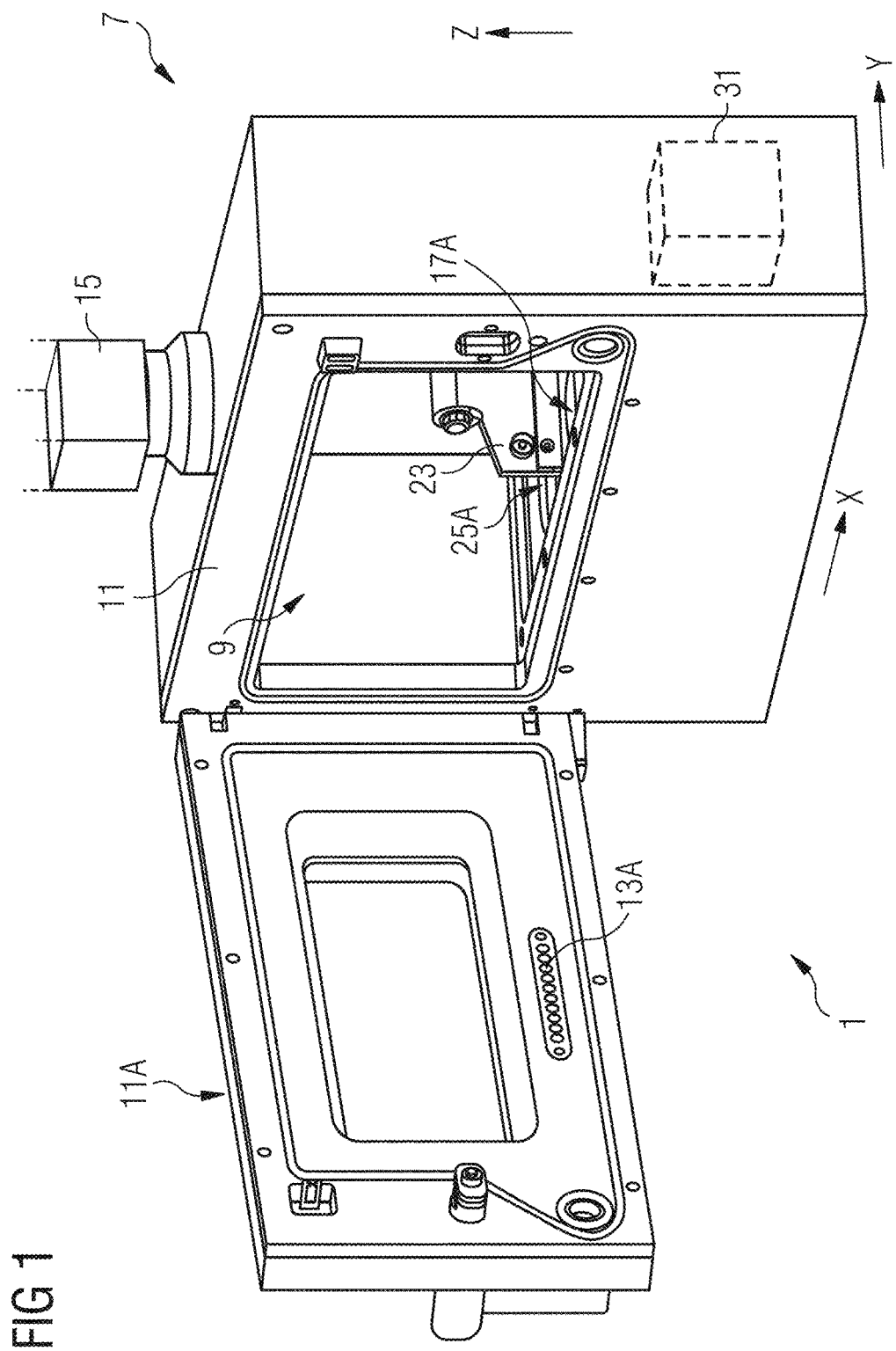
FIG. 1 is a schematic spatial representation of an example of a generative manufacturing device.

Aspects described herein are based in part on the realization that the actual feasibility of a desired geometry often correlates with the coating process and in particular with the direction of movement of the coater (application direction) to the resulting component. It has been recognized, for example, that during the manufacturing of near-surface regions pointing against the direction of movement of the coater, a process termination or component defects can occur. The fundamental advantages of LMF processes in terms of design freedom and the build-up of a geometry close to the final contour are very much limited by such direction-dependent buildability of overhangs. Taking this into account, concepts disclosed herein have been developed with which, for example, overhangs can be built up with steel materials, the overhangs pointing against the direction of the coater movement with overhang angles of 60° and less.

In generative manufacturing, layer models are usually used which are based on a sequence of layers, each of which is assigned a layer-specific contour of the component to be manufactured. In particular, an irradiation plan based on a layer model is proposed here, which applies less energy near the contour of the component in a layer, especially near the contour in downskin and sideskin regions, by only applying exposure to each, e.g., second or third (or $n^{th}$) layer (or, e.g., every second or third (or $n^{th}$) layer is not exposed), but the exposure is carried out with substantially the same (full) power of the laser radiation as that irradiated in the core region. The proposed procedure considerably simplifies the irradiation process and reduces the number of variables to be set during irradiation. The irradiation plan merely defines how many layers are to be exposed and how far from the contour the non-exposed layer regions are to extend into the component. The power of the laser radiation is essentially no longer varied and remains fixed at least in a transition region between the core and the shell. It is noted that in the overhang region of the component, one does not produce alternating melted and non-melted layers, but a continuously melted powder volume, because the exposure of a powder layer results in a melt that acts beyond the respective irradiated powder layer. Particularly in the case of very thin layers and a power of the laser radiation as it used in the core region, the powder of two or more layers is at least partially melted.

In summary, according to the disclosure, in a layer-based irradiation procedure a density of irradiated layers is selected in the shell region to be lower than in the core region. Thereby, when exposing the downskin region, for example, there is in consequence a higher layer thickness and, thus, a lower volume energy. In the downskin region, for example, only every $n^{th}$ layer is continuously exposed with the intensity assigned to the core region. In the layers in between, the downskin region is left out. For example, the volume energy introduced corresponds to half of the volume energy in the core when every second layer is continuously exposed, and to one third of the volume energy in the core when every third layer is exposed. This can result in the advantages mentioned above, such as buildability even against the direction of application of the coater of overhang angles of up to 30°, a reduction of the energy input in the regions close to the surface, and/or avoidance/reduction of powder accumulation in front of the component.

In general, the exposure of the downskin region as a continuous exposure with the inskin parameters can be carried out completely only up to the planned contour of the component in the respective layer, e.g., every second, third, or $n^{th}$ layer. In the layers in between, the downskin region, for example, is not exposed, but simply omitted in the irradiation planning.

It was also recognized that this procedure can also be used in the upskin region to improve the quality of the shell region, especially the surface.

FIGS. 1 to 3 show an example of a generative manufacturing device 1 for the additive manufacturing of a three-dimensional component 3 from a powder material (generally powder 5) in a perspective view as well as in schematic sectional views from above and from the front. For the manufacturing process, one can use the methods described in EP 2 732 890 A2 mentioned above and incorporated herein by reference.

The manufacturing device 1 includes a housing 7, which provides a manufacturing space 9. A door 11A in a front wall 11 provides access to the manufacturing space 9. The enclosure 7 further includes a protective gas extraction system with, e.g., outlet openings 13A for flooding the manufacturing space 9 with inert gas as well as extraction openings 13B. As an example, a flow pattern is indicated with arrows 13 in FIG. 2. As shown in FIG. 3, an irradiation system 15 mounted, for example, above the housing is configured to generate laser light, which fuses the powder 5 to form material layers of a 3D component 3.

The manufacturing process takes place on a work surface 27, which forms the bottom of manufacturing space 9 and has a platform area 17A, a supply area 25A, and (optionally) a powder collection area 29A. The manufacturing process takes place on a building platform 17, which is located in platform area 17A, e.g., centrally in front of the door 15A. The building platform 17 rests on a support 19, which can be moved vertically (in FIG. 3 in the ±Z direction) in a building cylinder 21. The supply area 25A is used to provide fresh powder 5A, which is transferred to the building platform area 23A with a coater 23 for the layer-by-layer manufacturing of the 3D component 3.

During generative manufacturing, a powder bed filled with metallic or ceramic powder, for example, is repeatedly prepared on the building platform 17 for irradiation with laser light from above. As shown in FIGS. 1 to 3, the coater 23 (often also referred to as the slider or wiper) is used to distribute the powder 5 in the X-direction during the manufacturing process. During coating, a lower area of the coater 23 sweeps over the work surface 27, taking powder with it and thereby filling, e.g., lower areas with respect to the work surface. In these areas, the lower region of coater 23 defines the level of the powder surface. For example, fresh powder 5, which is provided in a supply cylinder 25 provided in the supply area 25A, is pushed with the coater 23 moving in the X-direction over the working surface 27 into the platform area 17A, where it accumulates in the area of the lowered building platform 17 and the building platform 17 is coated accordingly, forming a fresh powder layer. Powder not required is, for example, transferred to a collection cylinder 29 provided in the powder collection area 29A.

As shown in the figures as an example, the supply area 25A, the platform area 17A, and the powder collection area 29A are arranged next to each other offset in X-direction, and the coater 23 can be moved in ±X-direction.

In summary, the manufacturing process includes a repeated lowering of the building platform 17 in the building cylinder 21, a build-up of a fresh powder layer on the building platform 17, and a melting of the powder layer in the area where the 3D component 3 is to be created according to the irradiation plan that is based on a layer model structure. FIG. 3 shows a partially completed 3D component 3 embedded in unmelted powder 5.

The manufacturing processes disclosed herein can be integrated into a manufacturing control, for example. For this purpose, manufacturing device 1 has a control unit 31 in which the irradiation plan is stored and which carries out the process according to the irradiation plan. In FIGS. 1 and 3, the control unit 31 is schematically indicated by dashed lines and connected to the irradiation system 15 and the drive 35 of the building platform 17 and the drive of the coater 23 via data connections 33 shown as dash-dotted lines.

The concepts disclosed herein allow to build up 3D-components layer by layer with the manufacturing device 1. Exemplary layer model structures of 3D parts are shown schematically in FIGS. 4A and 4B.

Figure 4A:
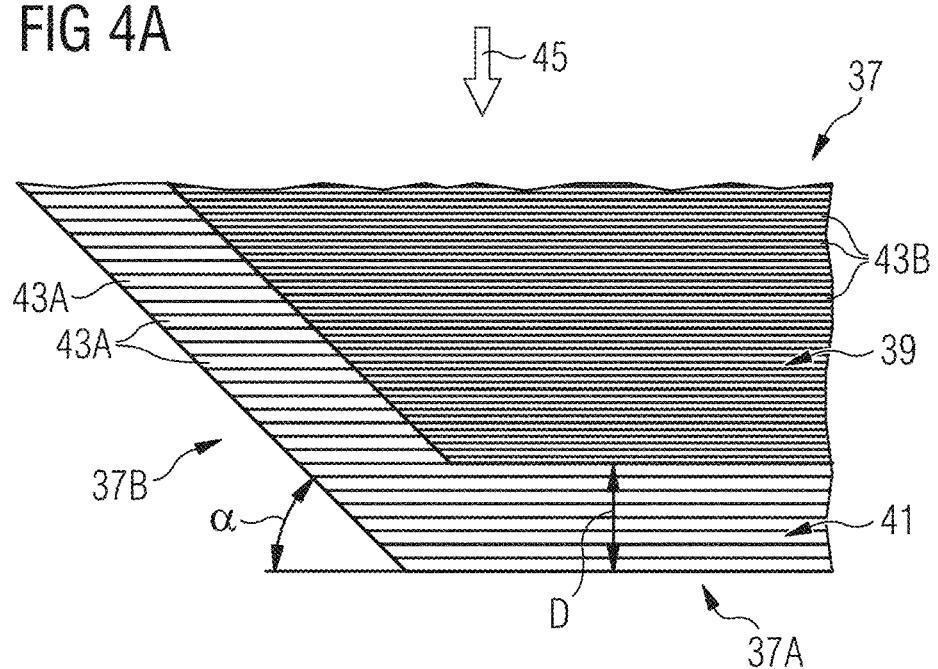
FIGS. 4A and 4B are schematics that illustrate a side view of different densities of irradiated layers in the downskin region and in the core region.

As a first example, FIG. 4A shows a section of a layered model structure of a component 37 with a core region 39 and a shell region 41, in which case the shell region 41 is a downskin region extending on an underside 37A of the component 37 and along an overhang 37B, whereby it is assumed that the laser radiation is incident in the direction of arrow 45 from above perpendicular to the formation of the layered structure of the component 37. The overhang 37B forms an inclined lateral surface which extends at an angle $\alpha$ with respect to the layer plane (essentially given by the plane of the building platform 17 during manufacture). In the shell region 41, the lines further apart indicate a lower density of irradiated layers 43A in the downskin region 41A, and the lines closer together indicate a higher density of irradiated layers 43B in the core region 39. In FIG. 4A, the thickness of the shell region 41 is indicated by an arrow D on the underside 37A.

Figure 4B:
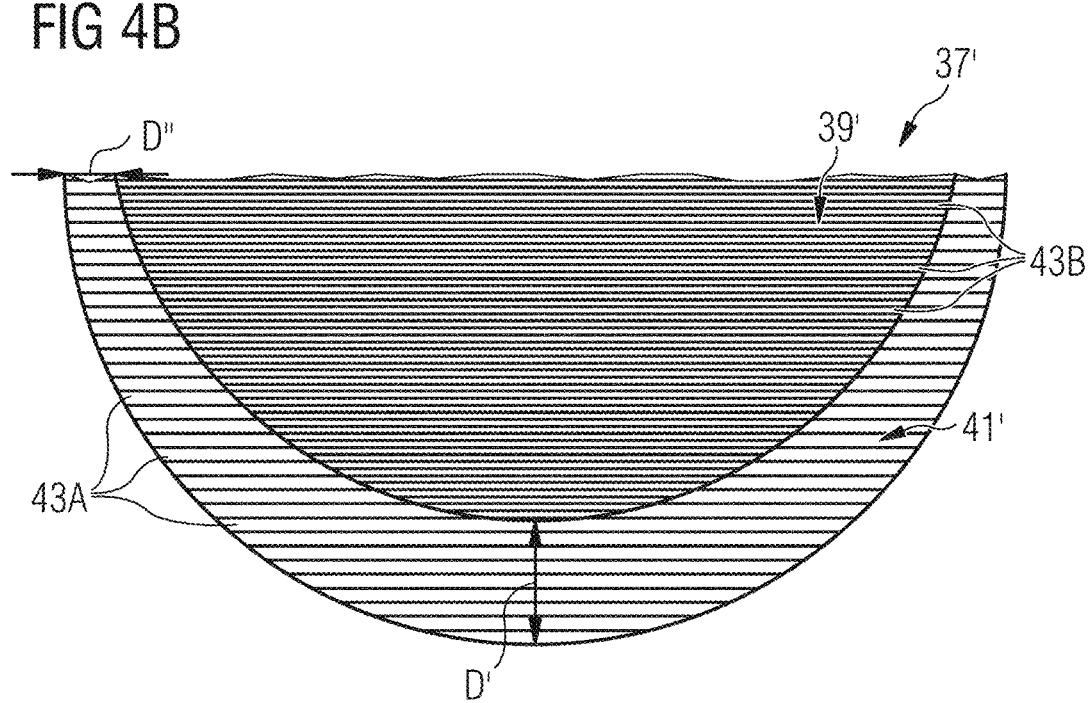

As another example, FIG. 4B shows a component 37' with a core region 39' and a region 41'. In contrast to component 37 in FIG. 4A, the bottom side 37A' is continuously curved and spherical. The thickness (arrow D') of the shell region 41' in the example of FIG. 4B depends on the orientation of the surface of the component 37' with respect to the layer plane. It tapers the more the steeper the surface is oriented towards the layer plane. The thickness can, for example, decrease to a smaller thickness (arrow D") at an angle of approx. 90° to the normal of the layer plane and possibly to zero at angles of more than 90° for which the surface corresponds to an upskin region. The thickness may also decrease to zero at an angle of approximately 90° or less. Also in FIG. 4B, the density of irradiated layers 43A, 43B in the shell region 41' and in the core region 39' is indicated by the proximity of the lines of the hatching.

The examples shown in FIGS. 4A and 4B illustrate the approach that parameterization of the irradiation can be carried out in a lateral direction (i.e., in the direction of the layer plane) and perpendicular to the layer plane. Thus, as explained below, the shell region 41, 41' can be defined by the extent of the individual irradiated regions (and thus by the extent of the non-irradiated regions) in the layer plane in interaction with the number of layers affected by the layer selection. In this way, the downskin region can be specifically adjusted for large overhang angles.

As further shown in the examples, several thick layers are irradiated on the underside, each with the intensity developed for the irradiation of n-fold thinner layers in the core region, so that the energy input on the underside is reduced overall and this despite, e.g., the application of n-fold thinner layers. Only in the core region, all of the now n-fold thinner layers are irradiated and manufacturing is carried out based on the inskin parameters. In this way, melting through the shell region on the underside can be avoided due to the increased number of layers affected by the layer selection, especially because on the underside 37A, the heat from the irradiation during manufacturing can flow off less well than, for example, in the upskin region, where it can flow off into the already solidified component 3.

Figure 5A:
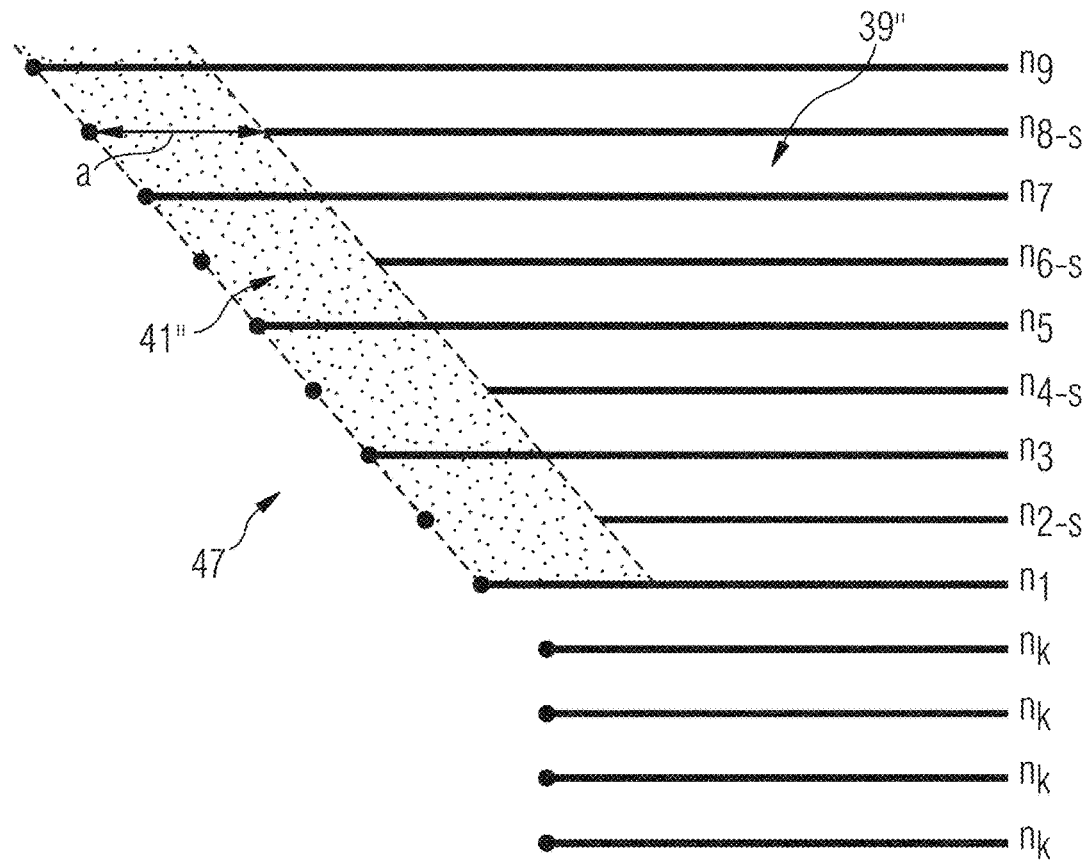
FIGS. 5A and 5B are schematic sectional views to illustrate examples of implementations of layer-selective irradiation in the transition region between the shell and the core.
Figure 5B:
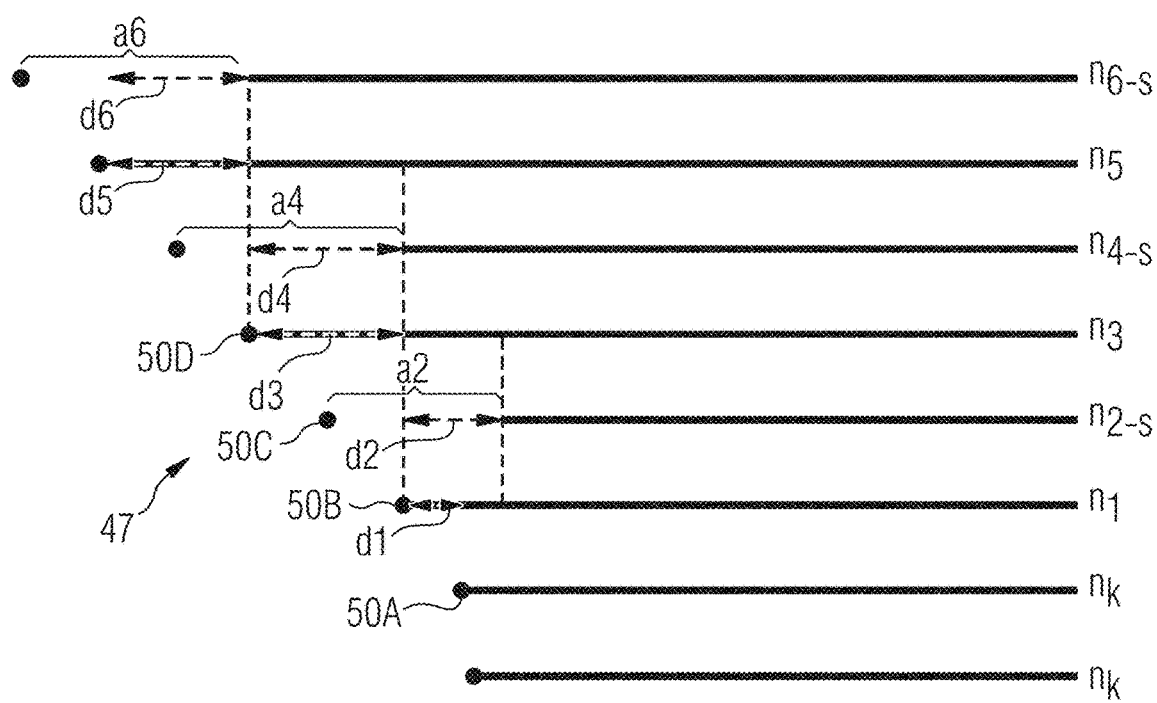

With layer model structures shown in the sectional view, FIGS. 5A and 5B illustrate how the extent of a shell region can be determined by the layer-selective irradiation. FIG. 5A schematically shows four core layers $n_k$ on which an overhang structure 47 is to be formed. The overhang structure 47 is connected to a core region 39", which is essentially above the core layers $n_k$. A layer $n_1$ initiates the formation of an overhang extending at an angle to the layer plane.

In this context, the layer plane is generally understood to be a plane, which in the layer model usually corresponds to the powder bed surface formed by the movement of the coater.

The overhang structure 47 is implemented by forming a specially manufactured shell region 41", which is generated by selective irradiation of the subsequent layers. It is noted that not every layer in the shell region 41" is irradiated up to the contour of the planned component, but that at least one selection is made for the layer-based irradiation, so that the irradiation of some layers is terminated at a distance from the contour. As an example, FIG. 5A shows a distance a for the layer $n_{8-s}$, in which the irradiation of the powder layer ends before the desired contour. Assuming an even slope of the overhang, the layers $n_{6-s}$, $n_{4-s}$ and $n_{2-s}$ can also be irradiated to a limited extent with respect to the contour in the example shown. The distance a can, for example, be in the range of 300 µm for layers applied with a layer thickness of 40 µm.

FIG. 5B shows the initial layers of the overhang structure 47 enlarged. The layer $n_1$ (i.e., the irradiated region of the $n_1$-powder layer) extends laterally over the uppermost core layer $n_k$ by a distance d1. The end of the layer $n_1$ defines a point of the contour 50B in the layer n1 desired for the transition structure 47. For example, d1 lies in this transition region to the overhang structure at 150 nm further out than contour 50A (40 µm layer thickness). In general, irradiation is carried out with the power from the core region, so that powder is at least partially melted below layer $n_1$. Irradiation in an area given by d1 forms the surface of the component in the overhang.

In accordance with the layer-selective irradiation, the irradiation of the layer $n_{2-s}$ is now not continued up to the desired contour course for the transition structure 47. Instead, the irradiation ends at a distance d2 before the end of the layer n1 and at a distance a2 before the end of the layer $n_{2-s}$ (contour 50C). Thus, unmelted powder remains at the lateral end of layer $n_{2-s}$, for example in a strip of d2=200 nm. It can be seen that the entire irradiation of the layer $n_{2-s}$ takes place in the immediate vicinity of a previously irradiated layer (here the layer $n_1$).

The end of layer $n_3$ should now again define the desired contour course (contour 50D) for the transition structure 47. For this purpose, layer $n_3$ extends laterally over layer $n_{2-s}$ by a distance d3+d2 (e.g., 400 nm). The end, thus, extends beyond the end of layer $n_1$ by a distance d3 (e.g., 200 nm) and defines a further point that determines the slope of the surface in this region of the overhang structure 47. The irradiation of layer $n_3$ acts in the shell region 41" initially on a powder layer twice as thick (in the example 80 nm) above layer $n_1$ in an area given by d2. Beyond this, there is no lower previously irradiated layer, so that the irradiation of layer n3 in an area given by d3 now forms the surface of the component in the overhang.

Similar to layer $n_{2\_s}$, the irradiation of layer $n_{4\_s}$ ends at a distance d4 (e.g., 300 µm) before the end of layer $n_3$. Correspondingly, unmelted powder remains at the lateral end of layer $n_{4\_s}$, which again leads to a powder layer twice as thick when irradiating layer n5. In the area given by d5, layer $n_5$ then forms the surface of the component in the overhang. The distances d6 and a6 define the layer $n_{6\_s}$ accordingly.

Thus, the layer-selected procedure refers to the selection of layers (in the example $n_{2\_s}$, $n_{4\_s}$, $n_{6\_s}$, $n_{8\_s}$), which are not to contribute to the surface shape, and of layers (in the example $n_1$, $n_3$, $n_5$, $n_7$, and $n_9$), which are to be irradiated up to the contour line and thus determine the surface shape.

Figure 9:
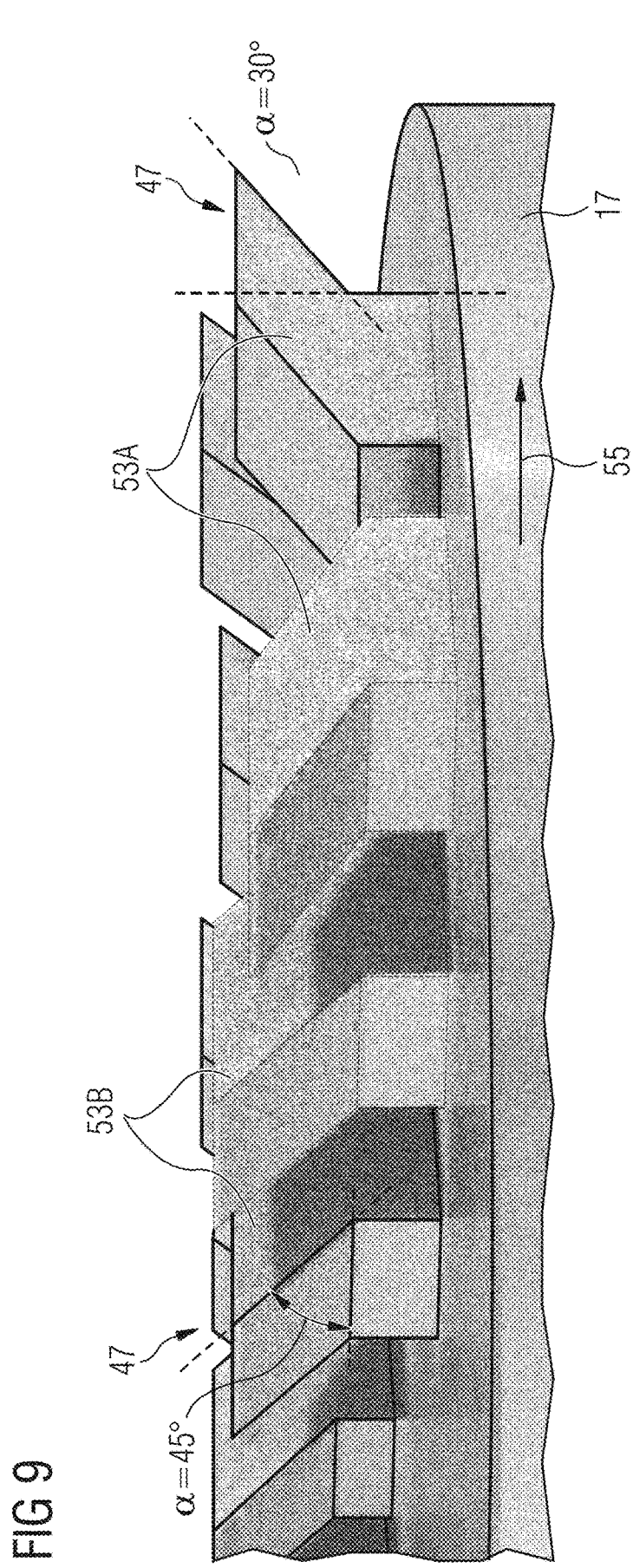
FIG. 9 is an image of several components whose overhang regions were produced with layer-selective irradiation.

FIGS. 6A to 6D illustrate the layer-selective irradiation in a top view of the layers $n_k$, $n_1$, $n_{2\_s}$, $n_3$ in the transition region between the shell region 41" and the core region 39", as they can be given, for example, for a straight contour of the layers in the area of the overhang structure 47 (see also FIG. 9). In the figures, irradiated regions are shown as dots, with additional exemplary scan vectors 49A, 49B, 49C, 49D being drawn. Furthermore, one can see the straight sections of the contours 50A, 50B, 50C, 50D, which are assigned to the overhang structure 47 and were drawn in FIGS. 5A and 5B (in a cut view).

The geometry of the layer $n_k$ is the starting point. The overlying layer $n_1$ extends over the irradiated region of the layer $n_k$. For clarification, a kind of core region k1 was indicated in FIG. 6B, which is located above the irradiated region of the layer $n_k$. In addition to the core region k1, another irradiated region h1 follows, which co-determines the shell region 41" and in this case is assigned to the distance d1.

The layer $n_{2\_s}$ extends over only a part of the irradiated region of layer $n_1$ and, thus, represents only a core region k2, which ends at a distance d2 before the end of layer $n_1$.

The layer $n_3$ extends over the irradiated region of the layer $n_{2\_s}$, i.e., another irradiated region h3 adjoins a core region k3. A first part 51A of the region h3 is assigned to distance d2 and extends above layer $n_1$. A second part 51B is assigned to the distance d3 and does not have an already irradiated region below it. The further irradiated region h3 also determines the shell region 41".

Depending on the angle of the overhang, in some embodiments, the extent of the other irradiated regions and in particular parts 51A, 51B can be selected in the direction of application. The larger these regions are, the flatter the overhang structure can become. The exposure, i.e., the energy input, is adapted to the extent of the other irradiated regions by, for example, only exposing each (n+x)-th layer, so that a volume energy favorable for the 41" shell region is obtained.

In general, the energy input can be adjusted depending on the overhang angle, so that, for example, a higher multiple of the layers is exposed with increasing overhang angle in the shell region. For example, an exposure of downskin regions in the shell region of overhangs with surfaces extending in an angular range from 0° to X° can expose every $4^{th}$ layer (or generally every $n^{th}$ layer). For surfaces extending in an angular range from X°-Y°, every 2nd layer (or generally every $m^{th}$ layer with m<n) can be exposed and for overhangs with surfaces extending in an angular range of Y°-90°, every layer can be exposed up to the contour. In this case, the downskin region in the shell region is divided into several (here, e.g., three) zones based on several overhang angles (here, e.g., $\alpha\_1=X°$ and $\alpha\_2=Y°$). The zones adjoin each other at the overhang angles.

Figure 7:
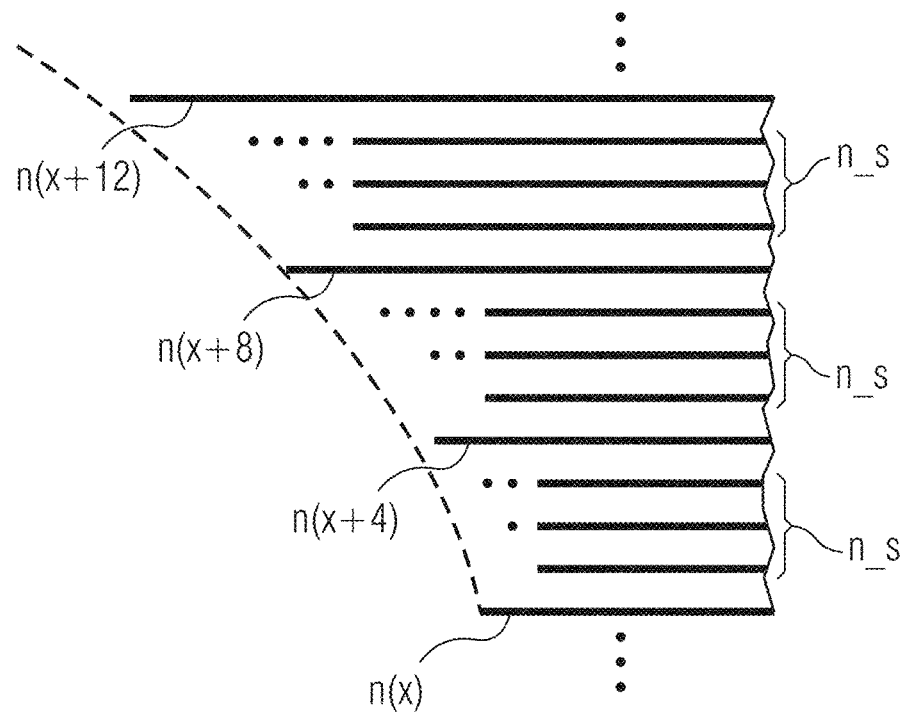
FIG. 7 is a schematic sectional view of another example of layer-selective irradiation in the transition region between the shell and the core.

FIG. 7 schematically shows further exemplary layer models in a sectional view.

For this, FIG. 7 shows in a schematic sectional view that only every fourth layer n(x), n(x+4), n(x+8), n(x+12), can continue to the desired course of the contour in the respective layer. This can be helpful, for example, if very thin layers of a few 10 µm are applied with the coater, so that the three layers n_s in between each lead to the desired reduction of the energy input in the shell region. In a variant of the embodiment shown with solid lines for the layers n_s, the (shortened irradiated) layers n_s end one above the other, so that in the projecting region of the layers n(x+4), n(x+8), n(x+12) there is always four times the layer thickness.

Alternatively, the layers n_s can follow the course of the surface of the overhang with an offset, as shown dotted for the layers n_s. In this alternative embodiment, each of the layers can, for example, be irradiated shortened by 200 µm from the contour so that a uniform shell region is formed.

Figure 8:
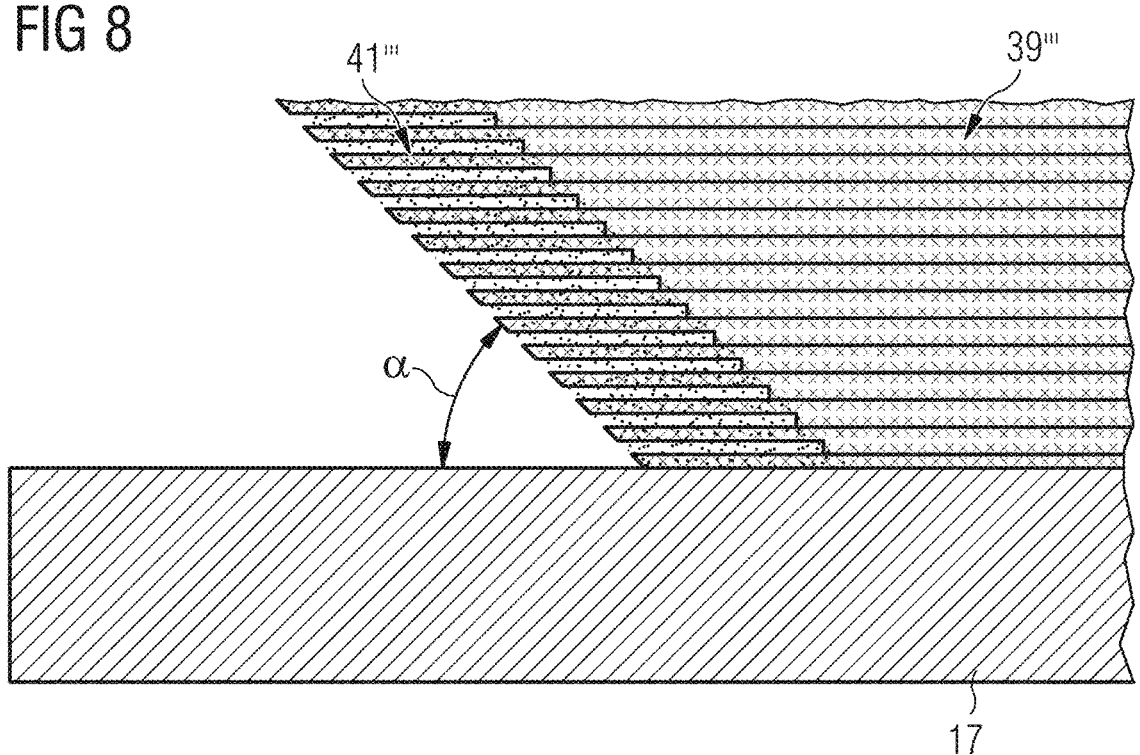
FIG. 8 is a schematic sectional view of a component manufactured with layer selective irradiation.

FIG. 8 schematically illustrates a component 3', which was manufactured with layer-selective irradiation on a building platform 17 and whose surface extends upwards from the building platform at an angle α. The regions of the layers that have been irradiated can be seen schematically on a light grey background. The dotted area indicates the area of thinner density of irradiated layers, i.e., a shell region 41''' with reduced energy input. It forms the surface of the component 3'. The shell region 41''' includes a core region 39" into which the (maximum) energy input has been made.

It is noted that in the overhang region of the component, there are no alternating molten and non-molten layers, but rather a continuously melted powder volume, because the exposure of a powder layer results in a melt that acts beyond the respective irradiated powder layer. Particularly in the case of very thin layers and a power of the laser radiation that is usual in the core region, the powder of two or more layers is at least partially melted.

FIG. 9 is an image of several components manufactured on a building platform 17 with a generative manufacturing device as shown in FIGS. 1 to 3. In the foreground one can see two components 53A, 53B, which have a clean surface structure in the overhang region also on the side facing away from a direction of movement 55 of the coater. The overhang regions were created without support structures with an overhang angle of 30° and 45° respectively.

Similar arrangements of test objects, which are identical in shape, can form the basis of the test manufacturing operations described above for test procedures to determine the parameters of a generative manufacturing process.

Figure 10:
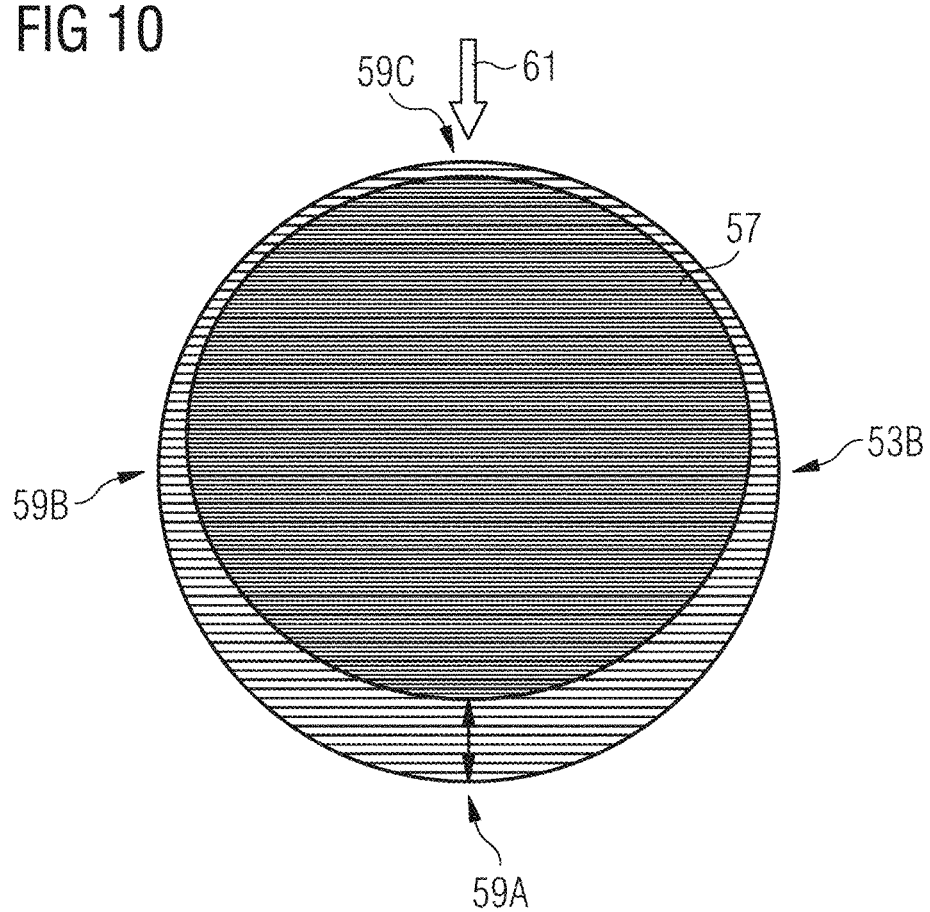
FIG. 10 is a schematic sketch to illustrate different densities of irradiated layers in general in the shell region and in the core region of a spherical component.

FIG. 10 illustrates that the concept of selective irradiation to influence the properties of the shell region is not limited to the downskin region, as it was exemplarily described in connection with FIGS. 4A and 4B. A core region 57 can be seen in a cross-sectional cut view, surrounded on all sides by a shell region in which the density of the irradiated layers has been reduced. The thickness of the shell region in the downskin region 59A was selected thicker than in the sideskin (inskin) areas 59B and in the upskin region 59C. The irradiation of the layers was carried out in the direction of an arrow 61 according to an irradiation plan that adjusts the volume energy in the shell region according to the concepts explained above. Alternatively, the concept of selective exposure could also be applied only in downskin regions which are below a critical angle and would therefore otherwise have to be built with supporting structures.

Figure 11:
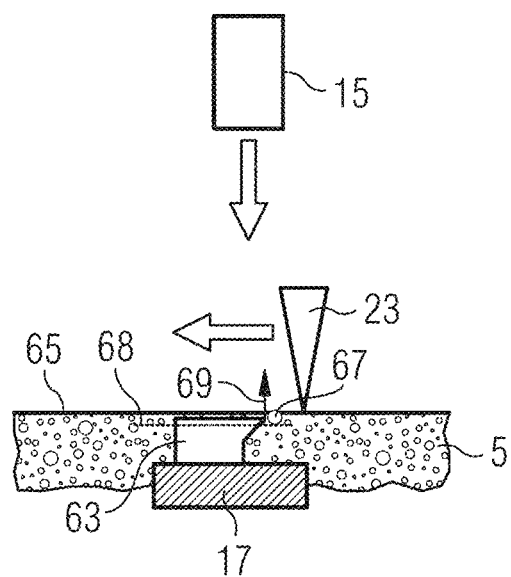
FIG. 11 is a schematic that illustrates the possible influence of the grain size of powder on thin layers.

FIG. 11 shows the situation described above that powder grain sizes of the powder 5 in the range of the layer thickness produced with the coater 23 (indicated by a dashed line 68)

can cause a lifting (arrow 69) and/or deformation of freshly produced areas of a component 63 over a surface 65 of the powder bed. In particular, especially large powder grains 67 may accumulate on the front of the component 63 and exert pressure on the area that has just been irradiated and freshly formed with the irradiation system 15. The deformation reduces the size of the gap between the lower edge of the coater 23 and the upper end of the component.

In addition to the effect of lifting overhanging structures in particular by large powder grains, as mentioned in connection with FIG. 11, there is also the possibility that the overhang edge may warp out of the powder bed due to internal stresses of the component. This can also reduce the size of the gap between the lower edge of the coater and the upper edge of the overhang. As the powder grains have a diameter of approx. 15 µm to 45 µm, the larger powder grains no longer fit through the gap and can accumulate in front of the overhang edge.

If the overhang is built up further in this direction, the effect can be intensified by the already accumulated powder, and the overhang edge draws even further towards the lower edge of the coater 23. This can lead to a collision between the upper edge of the component and the coater, which can cause the building process to stop. The concepts disclosed herein can reduce this risk.

For completeness, the approach of a downskin exposure, as it can be implemented, for example, in connection with the EP 3 127 635 A1 mentioned above, can also be combined with the selective downskin exposure proposed herein. In this case, the downskin exposure with the specifically determined energy values would be continued further into the interior of the component and thus implemented after application of the selective downskin exposure.

An example of an implementation of the use of varied laser parameters for irradiating near-contour regions is explained in connection with FIG. 12. An irradiation pattern 69 can be recognized, as it could be provided for the layer $n_3$ of FIG. 5B in the irradiation plan, for example.

The irradiation pattern 69 is based on (rectangular) irradiation fields arranged in a chessboard pattern, with each field being assigned a specific exposure path comprising several scan vectors. On the inside (left in FIG. 12), an arrangement of two types of (core) exposure paths 71*k*, 73*k* can be seen, where the solid lines indicate irradiation with inskin parameters. The exposure paths 71*k*, 73*k* are rotated by 90° to each other and cause the powder to melt to the extent intended for the core. In general, it is common practice to subdivide a layer into irradiation fields in this way, whereby different irradiation parameters can be defined in the irradiation plan for the irradiation fields, in particular to homogenize the volume energy input.

On the side of the contour line 50D', exposure paths 71*r*, 73*r* can be seen, which are shown in near-contour fields with dashed lines to illustrate a reduced (varied) laser power. If the contour line 50D' intersects a field, only the inner area of the field is irradiated with a correspondingly shortened scan vector to form the planned surface shape of the component. It is noted that short scan vectors in a field slow down manufacturing due to the partial irradiation of a field, as this requires many acceleration and deceleration processes for a small exposed region.

The combination of the approach of selective irradiation with energy reduction now leads to larger stripes along the contour line 50D', for example, which are irradiated with the laser intensity (to be set only once).

Figure 12:
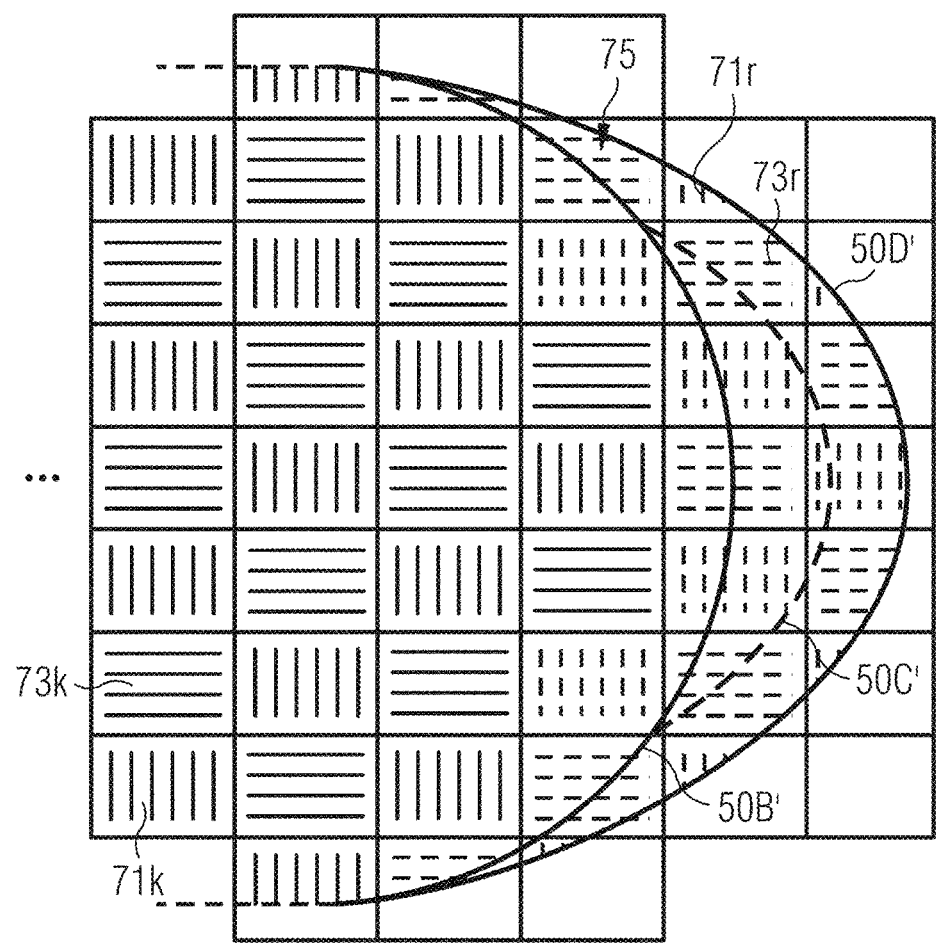
FIG. 12 is a schematic that illustrates the use of varied laser parameters when irradiating near-contour regions.

To clarify the background, FIG. 12 additionally shows a contour line 50C' and a contour line 50B' of the preceding (shortened irradiated layer (in FIG. 5B the layer $n_2$) and the last layer irradiated up to the contour (in FIG. 5B the layer $n_1$). It can be seen that if each layer ($n_1$, $n_2$, $n_3$) is irradiated up to the respective contour and the intensity is reduced only in the overhang region (e.g., according to EP 3 127 635 A1), two narrow strips result in layers $n_2$ and $n_3$. The strips would run between contour line 50B' and contour line 50C' and between contour line 50C' and contour line 50D' and be irradiated with a corresponding number of short scan vectors (not indicated in FIG. 12).

With the selective irradiation, the layer nz can now be irradiated with full intensity up to contour line 50C' (not shown in FIG. 12). For this, the irradiation of the layer $n_3$ shown in FIG. 12 extends with reduced intensity in a larger area between the contour line 50B' and the contour line 50D' and can, thus, be irradiated, among others, with correspondingly larger scan vectors, which accelerates the manufacture.

Furthermore, when combining the approach of selective irradiation with energy reduction, the irradiation plan can be designed in such a way that the transition from the inskin parameters to the modified laser parameters no longer follows the course of the contour line 50B' exactly, but the chess field structure remains as far as possible. In the exemplary implementation according to FIG. 12, all the fields through which the contour line 50B' runs are irradiated as a whole with the reduced laser power. Accordingly, only in the area of contour line 50D', there is a division of the fields into irradiated and non-irradiated regions. In other words, the chess fields touching the downskin region or where the preceding layer was at least partially not irradiated are exposed with reduced power. The irradiation process can, thus, be further accelerated.

This procedure can be implemented to particular advantageously if the transition lies further inside the component due to the selectively non-irradiated layers. However, in general with irradiation plans that reduce the intensity in the overhang region (e.g., according to EP 3 127 635 A1), the internal transition can be made on the basis of the irradiation fields.

Figure 13:
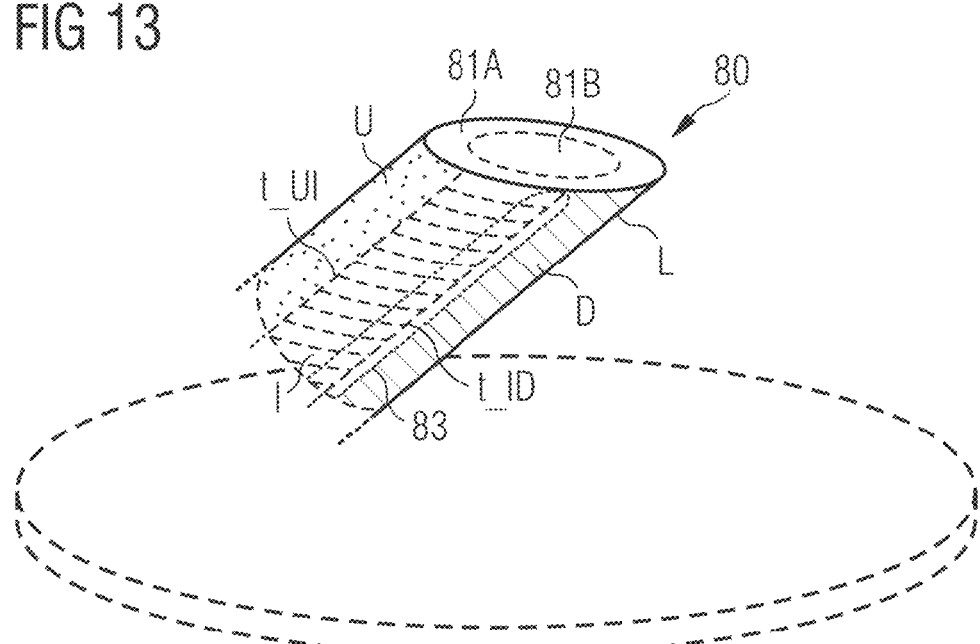
FIG. 13 is a schematic that illustrates different zones in the shell region of an inclined cylindrical component.

FIG. 13 schematically shows a component to be built up in layers with a section in the form of a tilted cylinder 80. To illustrate this, various zones have been indicated on the cylinder shell surface: an upskin zone U, an inskin zone I, and a downskin zone D, which are schematically separated by transition lines t_UI, t_ID in FIG. 13. The zones can be set up in a shell region 81A with their own layer-specific irradiation strategies, which differ from each other and possibly also from the irradiation strategy of a core region 81B. It can be seen that each layer has a multitude of orientation angles of the surface for the tilted cylinder 80. For example, the downskin zone D comprises a range of overhang angles that increase from both sides up to the line L running at the reversal point.

The different zones are given by angular regions under which the corresponding surfaces run. For example, the upskin zone U refers to upward facing surfaces up to a transition angle $\beta\_1$, which lies, e.g., in the range of 93°. The inskin zone I refers to surfaces facing sideways in an angular range between the transition angle $\beta\_1$ and a transition angle $\beta\_2$ characterizing a slight overhang (e.g., in the range from 93° to 87°). The downskin zone D refers to surfaces facing downwards, in this case from the transition angle $\beta\_2$ onwards, whereby a maximum surface slope that can be implemented e.g. without support structures is given by the critical angle specific to the manufacturing process (e.g., aimed for at 30°). The downskin zone D can be formed, for example, in an angular range from 87° to 0°, whereby it can be subdivided into further zones, e.g., into an angular range of 87° to 45°, an angular range of 45° to 30° and eventually into an angular range of 30° to 0°, if surfaces beyond the critical angle are also to be implemented, e.g., with the aid of support structures.

As already mentioned, the strict implementation of a defined transition angle can result in a visible abrupt change in the appearance of the different irradiation strategies along the transition line t_UI, t_ID.

As is now further proposed herein, a transition line t_UI, t_ID between defined zones U, I, D can be extended into a somewhat wider transition region 83, which is schematically indicated around the transition line t_ID in FIG. 13. Such an expansion leads to a smoothing of the appearance and structure in the region of the transition line t_UI, t_ID. Thereby, one can achieve a smooth transition between adjacent zones. This can be done, for example, by a random change of the irradiation strategies assigned to the two adjacent zones within the transition region 83.

FIGS. 14A and 14B show a generatively manufactured test object 85 with several sections 85A, 85B in which overhanging structures are formed (as schematic line drawing and photo). Two irradiation strategies were used in the manufacturing process, because the structure was divided into upskin regions and a downskin region. A gloss line t_UD can be seen in section 85A, which indicates the change between the irradiation strategies.

Figure 14:
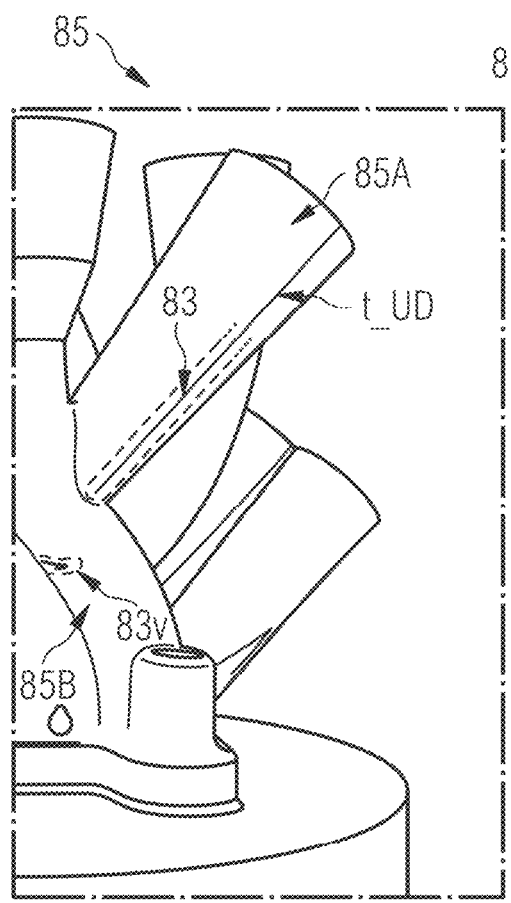
FIGS. 14A and 14B are a schematic and photographic image that illustrates transition regions of zone transitions on the surface of a test object.
Figure 14:
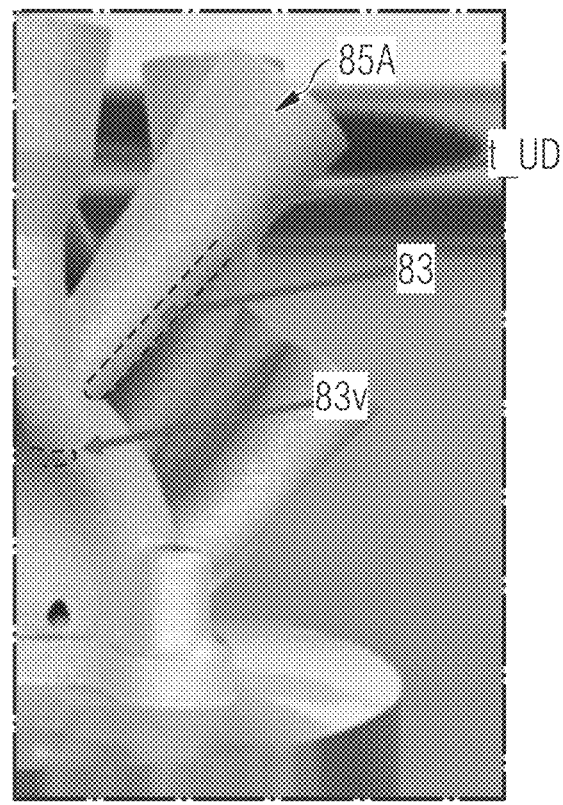

FIGS. 14A and 14B schematically illustrate how a transition region 83 can be provided in the area of the gloss line, which can be taken into account when assigning the irradiation strategies in the individual layers, as explained in connection with FIG. 15. For clarification, FIG. 14 also indicates a transition region 83v, in which irradiation strategies can alternate from layer to layer, i.e., in vertical direction, as explained in connection with FIG. 16. In both cases, the use of transition regions can lead to smoothened zone transitions on the surface of a test object.

Thus, a smoothing is done, e.g., in a transition region where the zone transition varies in the individual layers. The transition between individual zones can thereby be distributed spatially over a region. Accordingly, a zone transition in a transition region is not rigidly defined on the basis of a limit angle, but takes place successively, for example, in an angular range to be defined more closely. Thereby, adjacent zones can merge both in the layer plane (here the X-Y plane) and in the vertical direction, i.e., in the layer build-up direction (here the Z direction).

An implementation of a zone transition in the control of a building process of components can be achieved by different approaches.

In a first approach, a definition of different zones (upskin zone, downskin zone, inskin zone) is not done strictly from a certain angle, but within a defined angular range. A concrete zone transition angle to be used in a layer is defined layer by layer to a value within the specified angular limits. This can be done randomly or according to a specific pattern. In the latter case, the setting can lead, for example, to alternating irradiation strategies in regions of successive layers laying above each other (generally a multiple back and forth change between the irradiation strategies in a sequence of adjacent layers along the layer build-up direction) or irradiation strategies extend to differently far into a transition region forming the surface of the three-dimensional component 3.

In a further approach, different zones (upskin zone, downskin zone, inskin zone) are defined, as before, strictly from a certain angle. However, in each layer, one of the adjacent zones is slightly enlarged or reduced, e.g., by one or more irradiation fields, starting from the theoretical zone transition. This can again be done randomly or according to a systematics within previously set limits.

Figure 15A:
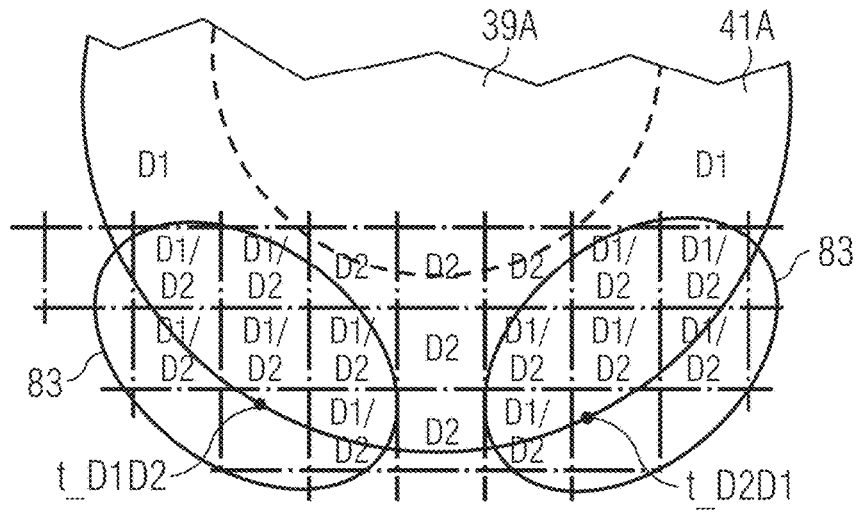
FIGS. 15A and 15B are front and side view schematics that illustrate a smoothing of a zone transition by introducing a transition region in a layer.
Figure 15B:
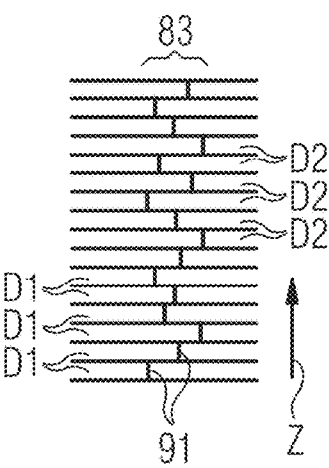

FIG. 15 schematically shows a layer 91 with a section 41A, which is assigned to a shell region, and a section 39A, which is assigned to a core region. In the shell region, two irradiation strategies D1 and D2 are provided depending on the overhang angle. Transition regions 83 extend between the irradiation strategies D1 and D2 in which, depending on the assignment, one of the irradiation strategies D1 and D2 is used in irradiation fields D1/D2 that are indicated schematically.

For the sake of completeness, transition lines t_D1D2, t_D2D1 are indicated where, without implementation of the concepts proposed herein, the transitions between D1 and D2 or D2 and D1 would run.

In accordance with the approaches proposed herein, it is possible to select the change between the irradiation strategies D1 and D2 in the transition region 83 in a layer, whereby each change within a layer is performed in such a way that a spatial position of the change in a sequence of adjacent layers varies bidirectionally. This is illustrated in a schematic view of several layers in the area of the transition line t_D1D2 in the right half of the figure. Each change is drawn as line 91 in the individual layers. On the left side of each line 91, generative manufacturing is performed with irradiation strategy D1, and on the right side of each line 91 with irradiation strategy D2. It can be seen that the positions of the lines (i.e., the change) vary in both directions and that they are arranged in a correspondingly shifted manner. This results in a multiple back and forth change between the irradiation strategies in a sequence of adjacent layers along the layer build-up direction (Z direction in FIG. 15).

In other words, the spatial position of the change and/or the back and forth change is caused by assigning transition parameters, in particular zone transition angles, in an angle range around a predetermined transition angle (corresponding to the indicated transition lines t_D1D2, t_D2D1). In general, the assigning can be made in particular by a random algorithm or according to a predetermined pattern. Furthermore, the spatial position of the change and/or the back and forth change can be effected by assigning a predetermined transition angle and by increasing or decreasing zones resulting from the transition angle. Increasing or decreasing the zones resulting from the transition angle can be done, for example, by a random algorithm or according to a predetermined pattern in the transition region.

Figure 16A:
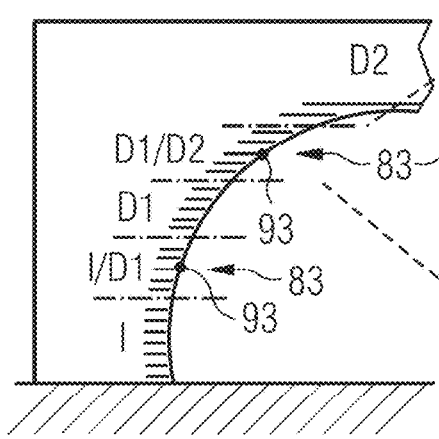
FIGS. 16A, 16B, and 16C are schematics that illustrate a smoothing of a zone transition by introducing a transition region in the layer building direction.

FIG. 16A shows a side view of a component with a curved side surface, whereby the side surface forms downskin regions with decreasing overhang angles starting from an inskin area. The inskin area is created with irradiation strategy I and the downskin regions are created in the shell region with two irradiation strategies D1 and D2. FIG. 16A shows correspondingly two transition regions 83, which are defined in the range of predetermined transition parameters (predetermined overhang angles which differentiate between the irradiation strategies). Exemplary predetermined overhang angles are indicated in FIG. 16A with points 93, whereby a gloss line would form along the associated layer if the concepts proposed herein for smoothing the transition were not implemented.

Figure 16B:
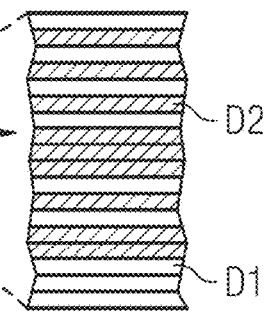
Figure 16C:
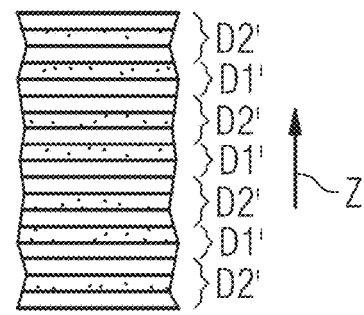

As an example, two approaches are shown in FIGS. 16B and 16C for smoothing the transition in the upper transition region 83. According to the approach shown in FIG. 16B, successive layers in the upper transition region 83 are generated randomly with either irradiation strategy D1 or irradiation strategy D2. The approach shown in FIG. 16C refers to the previously discussed reduction of the irradiated layers as a function of overhang angle ranges. For example, between the transition regions 83, only every second layer is irradiated (irradiation strategy D1') and with the even flatter overhang angles only every third layer is irradiated (irradiation strategy D2'). In the upper transition region 83, the irradiation strategies D1' or D2', for example, are used according to a predefined pattern (here alternating).

It is noted that the approach shown in FIG. 16C can also be adapted to a change in a layer or group of layers (see description of FIG. 15), where each change is made, for example, within a group of layers in such a way that a spatial position of the change varies bidirectionally in a sequence of adjacent groups of layers.

Other Embodiments

Alternative approaches to the use of different irradiation strategies in a transition region include, for example, a preference for an irradiation strategy near the zone where the respective irradiation strategy is primarily implemented.

In addition to an improvement in the appearance of the component, the use of transition regions can result in further advantages such as an improved surface quality of the components, as the roughness at zone transitions can be reduced, or improved mechanical properties, as the melting process can be positively influenced to a small extent, for example.

One will also acknowledge that the aspects disclosed herein can also be used in combination with so-called "adaptive slicing." In adaptive slicing, component surfaces that are only at a small angle to the powder layer planes are produced using thinner layers than component surfaces that are (almost) perpendicular to the powder layer planes. In this way, for example, a less rough surface can be obtained and the manufacturing time can be shortened while maintaining good surface quality overall.

It will be acknowledged that the concepts disclosed herein may be implemented throughout the shell region or only in a section of the shell region. For example, the concepts disclosed herein may be implemented in an overhang region facing away from the coating direction, but not in a portion of the shell region facing in the coating direction.

In view of the concepts disclosed here, the powder layer thicknesses across the component and, thus, the energy input required for the core region can also vary in the core regions and shell regions. However, when implementing the concepts disclosed herein, at least in a sub-region of the layer structure, the density of the irradiated powder layers in the shell region is lower than the density of the adjacent core region (if such an area exists). Layers of the shell region without an adjacent core region in the layer direction then have a density that is lower than for a core region, which would be adjacent thereto.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A method for generative manufacturing a three-dimensional component from a powder, the method comprising
providing a layer structure model of the three-dimensional component to be manufactured, wherein the layer structure model is a computer program and includes a sequence of layers, each of which is associated with a layer-specific contour of the three-dimensional component;
instructing a control unit to divide the layer structure model into a core region and a shell region adjacent to the core region, wherein the shell region forms at least a portion of the surface of the three-dimensional component; and
performing a layer-based irradiation process that comprises a sequential application of powder layers for forming a powder bed and that is based on the layer structure model to produce the three-dimensional component, wherein powder layers are irradiated such that, for a section of the shell region and a section of the core region, which, in a layer plane given by a surface of the powder bed, is adjacent to the section of the shell region, a density of irradiated powder layers in the section of the shell region is lower than a density of irradiated powder layers in the section of the core region, and
wherein the powder layers in the section of the shell region are subject to a layer-selective irradiation in which not each powder layer is irradiated.

2. The method of claim 1, wherein the powder layers are irradiated with a core energy input, and
wherein the core energy input corresponds to an energy to be introduced into the powder on average to obtain a powder-specific interaction that is intended for the core region of the component.

3. The method of claim 1, wherein during the layer-selective irradiation of the section of the shell region, the density of irradiated powder layers is varied in dependence on the surface geometry of the three-dimensional component, and
wherein the density of irradiated powder layers in the section of the shell region is further reduced in a region of an overhang structure the larger a distance between contours of adjacent powder layers is or the flatter the overhang structure extends to the layer plane given by the surface of the powder bed.

4. The method of claim 1,
wherein in the section of the shell region only every nth layer, wherein n>2, of the applied powder layers is irradiated, or
wherein in the section of the shell region every nth layer, wherein n>2, of the applied powder layers is not irradiated.

5. The method of claim 1,
wherein the irradiation within a powder layer in the core region and in the shell region is carried out with an equal laser power setting, and
wherein an energy input in the shell region is reduced in comparison with a core energy input in the core region despite the same laser power setting due to the layer-selective irradiation, in which not each powder layer is irradiated in the shell region.

6. The method of claim 1, wherein, in the section of the shell region, each irradiated powder layer coincides with an irradiated powder layer in the section of the core region and each powder layer is irradiated in the section of the shell region and in the section of the core region in a common irradiation process.

7. The method of claim 1, wherein, when performing the layer-based irradiation process in a bottom section of the shell region, for which there is no adjacent core region in the layer plane direction, inskin parameters are used for the irradiation process that are provided for the density of irradiated powder layers in the section of the core region, which is higher than the density of the irradiated powder layers in the bottom section of the shell region.

8. The method of claim 1, further comprising, applying a powder layer to be irradiated having a thickness in the range of a mean grain size of the powder.

9. The method of claim 1, further comprising, applying a powder layer to be irradiated having a thickness in the range of 30% to 300% of a mean grain size of the powder.

10. The method of claim 1, wherein
the surface of the three-dimensional component has at least two adjacent zones to which at least two irradiation strategies are assigned, wherein at least one of the irradiation strategies comprises the irradiation process based on the layer structure model, in which the density of irradiated powder layers in the section of the shell region is lower than in the section of the core region adjacent to the section of the shell region, in the layer plane direction, and
in a transition region of the zones, which forms the surface of the three-dimensional component, there is performed one or both of
a change between the irradiation strategies within a powder layer such that a spatial position of the change in a sequence of adjacent powder layers varies bidirectionally, or
a multiple change back and forth between the irradiation strategies in the sequence of adjacent powder layers along a layer build-up direction.

11. The method of claim 10,
wherein the at least two adjacent zones include at least one irradiation zone for the shell region and one irradiation zone for the core region, which is produced with the irradiation process according to the core region, or
wherein the at least two adjacent zones are formed in the shell region, or
wherein the at least two adjacent zones include an upskin zone, a downskin zone, and/or an inskin zone.

12. The method of claim 10, wherein the spatial position of the change and/or the multiple change back and forth is effected by assigning transition parameters in an angular range around a predetermined transition angle, wherein the assignment is effected randomly or according to a predetermined pattern.

13. The method of claim 10, wherein the spatial position of the change, the multiple change back and forth, or both is effected by an assignment of a predetermined transition angle, and increasing or decreasing zones resulting from the transition angle, wherein the increasing or decreasing of the zones resulting from the transition angle is effected randomly or according to a predetermined pattern in the transition region.

14. A method for generative manufacturing of a three-dimensional component from a powder, the component having an overhang structure and being manufactured on a building platform by selective laser melting, the method comprising
providing an irradiation plan based on a layer model of the three-dimensional component, wherein the layer model is a computer program and includes a sequence of layers, each of which is associated with a layer-specific contour of the component, wherein the sequence includes a first subgroup of layers and a second subgroup of layers, which are interleaved in one another, wherein in the first subgroup of layers in the region of the overhang structure, irradiating the powder up to the layer-specific contour is planned, and in the second subgroup of layers in the region of the overhang structure, irradiating the powder is planned only up to a distance from the layer-specific contour, and
performing a sequential application of powder layers on the building platform for forming a powder bed and irradiating the powder layers with irradiation parameters of the laser beam according to the irradiation plan,
wherein, in the layer model, a layer is subdivided into irradiation fields, wherein powder layers within irradiation fields in a shell region are subject to a layer-selective irradiation in which not each powder layer is irradiated.

15. The method of claim 14, wherein, for applying the powder layers, powder is applied with a coater from a supply region in an application direction and the overhang structure is aligned against the application direction in such a way that the contour of at least one powder layer to be subsequently irradiated in the region of the overhang structure extends closer to the supply region than the contour of a previously irradiated powder layer, and/or
wherein the irradiation parameters of the laser beam are fixedly set according to the desired interaction of the laser beam with the powder in a core region of the component.

16. The method of claim 14, wherein an irradiation process inputs less energy into irradiation fields in the shell region, than into irradiation fields in a core region.

17. The method of claim 16, wherein irradiation fields of a given layer, which are cut by the contour of the component, are irradiated only in an inner region for forming the component, and/or
wherein an irradiation, which puts less energy into the irradiation fields, begins in a region of the irradiation fields, which are cut by a contour of a previously irradiated layer projected onto the layer, in the layer direction, wherein the previously irradiated layer has been irradiated in the shell region up to the respective layer-specific contour, and/or
wherein the irradiation fields, which are cut by the contour of a previously irradiated layer projected onto the layer, in the layer direction, are irradiated as a whole with less energy than input into irradiation fields in the core region or as a whole with the energy input of into irradiation fields in the core region.

18. A manufacturing device for generative manufacturing of a three-dimensional component from a powder comprising:
a manufacturing space providing a work surface and including a platform area;
a building cylinder, which has a vertically movable support on which the three-dimensional component is to be manufactured in layers on a surface of a building platform;
a pusher device with a coater for producing powder layers with the powder in a building platform area to form a powder bed;
an irradiation system for generating a beam for irradiating the powder layers in the building platform area to produce the three-dimensional component layer by layer; and a control unit that, based on irradiation data of an irradiation plan of the three-dimensional component, controls the manufacturing of the three-dimensional component according to a method comprising dividing a layer structure model of the component to be manufactured into a core region and a shell region adjacent to the core region, wherein the layer structure model is a computer program, and wherein the shell region forms at least a portion of the surface of the three-dimensional component; and performing a layer-based irradiation process that comprises a sequential application of powder layers for forming the powder bed and that is based on the layer structure model, wherein powder layers are irradiated such that, for a section of the shell region and a section of the core region, which, in a layer plane given by a surface of the powder bed, is adjacent to the section of the shell region, a density of irradiated powder layers in the section of the shell region is lower than a density of irradiated powder layers in the section of the core region, wherein the irradiation data define the regions to be irradiated of the powder layers, the regions to be irradiated include the shell region and the core region, and the density of irradiated powder layers is lower in the shell region than in the core region, and wherein the powder layers within the section of the shell region are subject to a layer-selective irradiation in which not each powder layer is irradiated.

19. A component generatively manufactured from a powder by the method of claim 1, wherein the component comprises:

a core region and a shell region, wherein the shell region forms at least part of a surface of the component, at least a section of the shell region is formed by selective laser melting with a reduced energy input by irradiating fewer layers in a layering direction than in the core region adjacent to the section of the shell region, and in the shell region or in a section of the shell region, each irradiated powder layer coincides with an irradiated powder layer in the core region.

* * * * *